US012749232B2

(12) United States Patent
Ham et al.

(10) Patent No.: US 12,749,232 B2
(45) Date of Patent: Sep. 29, 2026

(54) LOCALIZED ATTENTION-GUIDED SAMPLING FOR IMAGE GENERATION

(71) Applicant: ADOBE INC., San Jose, CA (US)

(72) Inventors: Cusuh Ham, Boston, MA (US); Matthew David Fisher, Burlingame, CA (US); Nicholas Isaac Kolkin, Chicago, IL (US); Yuchen Liu, Mountain View, CA (US); Richard Zhang, Burlingame, CA (US); Tobias Hinz, Campbell, CA (US)

(73) Assignee: ADOBE INC., San Jose, CA (US)

( * ) Notice: Subject to any disclaimer, the term of this patent is extended or adjusted under 35 U.S.C. 154(b) by 174 days.

(21) Appl. No.: 18/664,600

(22) Filed: May 15, 2024

(65) Prior Publication Data

US 2025/0356551 A1 Nov. 20, 2025

(51) Int. Cl.
*G06T 11/60* (2026.01)
*G06T 5/50* (2006.01)
*G06T 7/194* (2017.01)

(52) U.S. Cl.
CPC ................ *G06T 11/60* (2013.01); *G06T 5/50* (2013.01); *G06T 7/194* (2017.01); *G06T 2207/20221* (2013.01)

(58) Field of Classification Search
CPC ............. G06T 2207/20084; G06T 5/70; G06T 2207/20081; G06T 11/60; G06T 2207/20221; G06T 5/50; G06T 5/60; G06T 3/14; G06T 3/18; G06F 3/048; G06F 40/284; G06F 8/35
See application file for complete search history.

(56) References Cited

U.S. PATENT DOCUMENTS

| | | | | |
|---|---|---|---|---|
| 11,995,803 | B1 * | 5/2024 | Karpman | G06T 5/70 |
| 2023/0080693 | A1 * | 3/2023 | Hu | G06T 5/70 382/275 |

OTHER PUBLICATIONS

Alaluf et al. ("ReStyle: A Residual-Based StyleGAN Encoder via Iterative Refinement", IEEE/CVF International Conference on Computer Vision (ICCV), 2021 (Year: 2021).*

1Balaji, et al., "eDiff-I: Text-to-Image Diffusion Models with an Ensemble of Expert Denoisers", arXiv preprint arXiv:2211.01324v5 [cs.CV] Mar. 14, 2023, 24 pages.

2Gal, et al., "An Image is Worth One Word: Personalizing Text-to-Image Generation using Textual Inversion", arXiv preprint arXiv:2208.01618v1 [cs.CV] Aug. 2, 2022, 26 pages.

3Hu, et al., "LoRa: Low-Rank Adaptation of Large Language Models", arXiv preprint arXiv:2106.09685v2 [cs.CL] Oct. 16, 2021, 26 pages.

(Continued)

*Primary Examiner* — Hau H Nguyen
(74) *Attorney, Agent, or Firm* — F. CHAU & ASSOCIATES, LLC

(57) ABSTRACT

A method, apparatus, non-transitory computer readable medium, and system for image generation include obtaining an input prompt. A customized residual is added to a base parameter of an image generation model based on an element of the input prompt to obtain an updated parameter. The customized residual is determined based on the element of the input prompt. A synthesized image is generated using the image generation model with the updated parameter. The synthesized image depicts the element based on the input prompt.

20 Claims, 18 Drawing Sheets

(56) References Cited

OTHER PUBLICATIONS

4Kumari, et al., "Multi-Concept Customization of Text-to-Image Diffusion", In Proceedings of the IEEE/CVF Conference on Computer Vision and Pattern Recognition, pp. 1931-1941, Jun. 2023.
5Ruiz, et al., "DreamBooth: Fine Tuning Text-to-Image Diffusion Models for Subject-Driven Generation", In Proceedings of the IEEE/CVF Conference on Computer Vision and Pattern Recognition, pp. 22500-22510, June 2023a.
6Vaswani, et al., "Attention Is All You Need", 31st Conference on Neural Information Processing Systems (NIPS 2017), Dec. 30, 2017.
7Ho, et al., "Denoising Diffusion Probabilistic Models", 34th Conference on Neural Information Processing Systems, 33:6840-6851, Dec. 2020.
8Radford, et al., "Learning Transferable Visual Models From Natural Language Supervision", Proceedings of the 38th International Conference on Machine Learning, pp. 8748-8763. PMLR 139, Jul. 2021.
9Ruiz, et al., "HyperDreamBooth: HyperNetworks for Fast Personalization of Text-to-Image Models", arXiv preprint arXiv:2307.06949v1 [cs.CV] Jul. 13, 2023, 12 pages.

* cited by examiner

LOCALIZED ATTENTION-GUIDED SAMPLING FOR IMAGE GENERATION

BACKGROUND

The following relates generally to image processing, and more specifically to image generation using machine learning. Digital image processing refers to the use of a computer to edit a digital image using an algorithm or a processing network. In some cases, image processing software can be used for various tasks, such as image editing, image restoration, image generation, etc. Recently, machine learning models have been used in advanced image processing techniques. Among these machine learning models, diffusion models and other generative models such as generative adversarial networks (GANs) have been used for various tasks including generating images with perceptual metrics, generating images in conditional settings, image inpainting, and image manipulation.

Image generation, a subfield of image processing, includes the use of diffusion models to synthesize images. Diffusion models can be used for various image generation tasks including image super-resolution, generation of images with perceptual metrics, conditional generation (e.g., generation based on text guidance), image inpainting, and image manipulation. Specifically, diffusion models are trained to take random noise as input and generate unseen images with features similar to the training data.

SUMMARY

The present disclosure describes systems and methods for image generation. Embodiments of the present disclosure include an image generation apparatus configured to receive an input prompt and generate a synthesized image using a machine learning model tuned for concept-driven image generation. In some examples, the image generation apparatus learns a set of personalized residuals that encode the identity of a target concept. The set of personalized residuals are updated at training via a latent diffusion loss function. The set of personalized residuals are then added to an existing set of diffusion parameters to obtain a set of updated parameters. At inference, the personalized residuals (just learned) are applied exclusively in areas that the cross-attention layers have localized the concept via predicted attention maps. In some examples, the identity represented through the personalized residuals is applied exclusively in regions corresponding to the target concept, and the remaining regions are generated by the original diffusion model.

A method, apparatus, and non-transitory computer readable medium for image generation are described. One or more embodiments of the method, apparatus, and non-transitory computer readable medium include obtaining an input prompt; adding a customized residual to a base parameter of an image generation model based on an element of the input prompt to obtain an updated parameter, wherein the customized residual is determined based on the element of the input prompt; and generating, using the image generation model with the updated parameter, a synthesized image depicting the element based on the input prompt.

A method, apparatus, and non-transitory computer readable medium for image generation are described. One or more embodiments of the method, apparatus, and non-transitory computer readable medium include obtaining a training set including a reference image depicting an element; and training, using the training set, an image generation model to generate images depicting the element of the reference image by determining a customized residual to be added to a base parameter of the image generation model.

An apparatus and method for image generation are described. One or more embodiments of the apparatus and method include at least one processor; at least one memory including instructions executable by the at least one processor; and an image generation model comprising parameters in the at least one memory and trained to generate a synthesized image based on an input prompt using a customized residual that is added to a base parameter of the image generation model based on an element of the input prompt, wherein the customized residual is determined based on the element of the input prompt.

DETAILED DESCRIPTION

Figure 1:
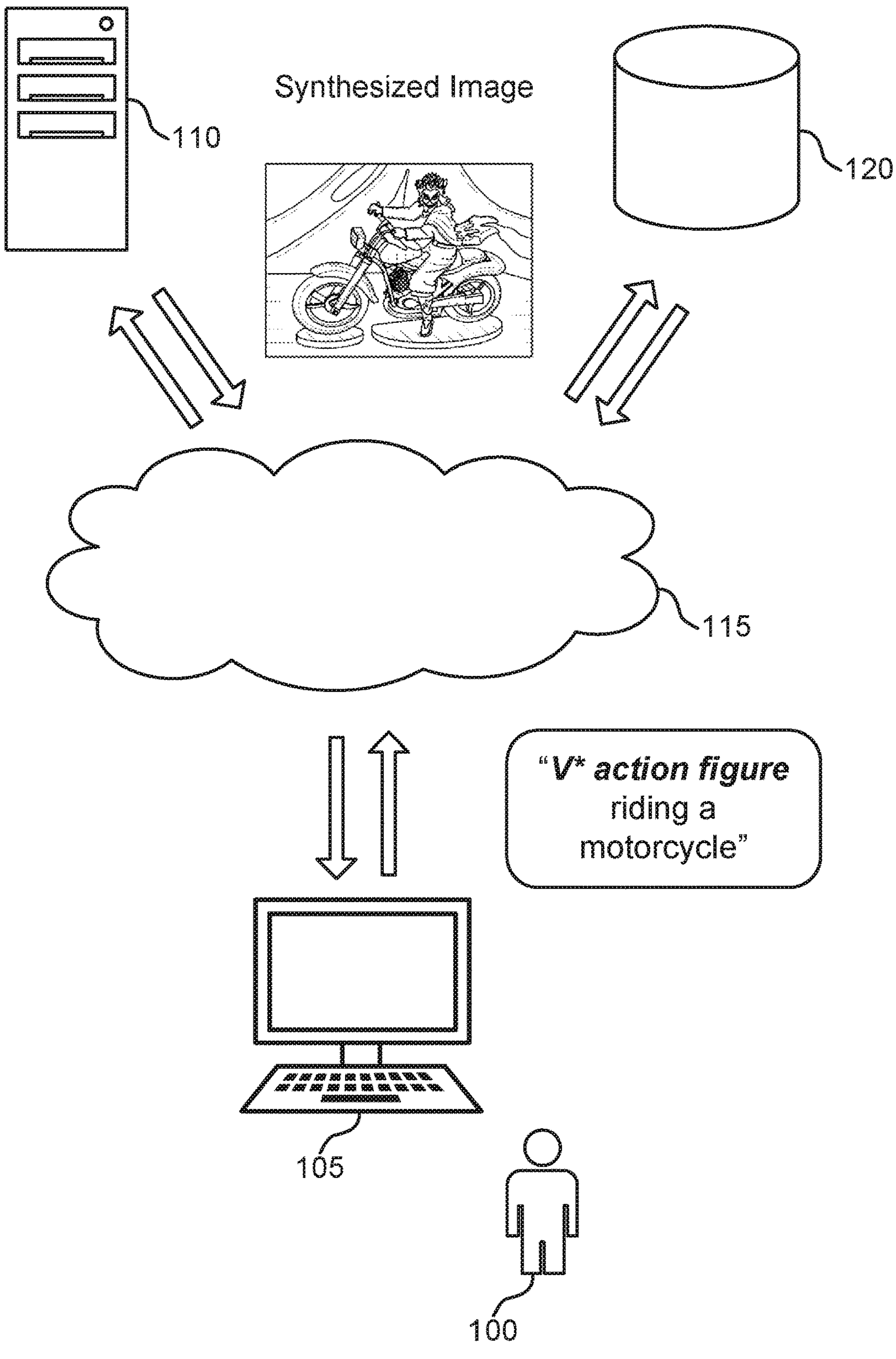
FIG. 1 shows an example of an image generation system according to aspects of the present disclosure.

The present disclosure describes systems and methods for image generation. Embodiments of the present disclosure include an image generation apparatus configured to receive an input prompt and generate a synthesized image using a machine learning model tuned for concept-driven image generation. In some examples, the image generation apparatus learns a set of personalized residuals that encode the identity of a target concept. The set of personalized residuals are updated at training via a latent diffusion loss function. The set of personalized residuals are then added to an existing set of diffusion parameters to obtain a set of updated parameters. At inference, the personalized residuals (just learned) are applied exclusively in areas that the cross-attention layers have localized the concept via predicted attention maps. In some examples, the identity represented through the personalized residuals is applied exclusively in regions corresponding to the target concept, and the remaining regions are generated by the original diffusion model.

Diffusion models are a class of generative neural networks that can be trained to generate new data with features similar to features found in training data. Diffusion models can be used in image synthesis, image completion tasks, etc. However, diffusion models may generate poor results because diffusion models often fail to encode information about the identity of a specific concept. Conventional models require fine-tuning the entire model's parameters to learn a specific concept and the fine-tuning process needs to be done on a per-concept basis. This results in expensive training cost and lengthy training time because a large number of parameters are to be updated.

Embodiments of the present disclosure include an image generation apparatus configured to take an input prompt and generates a synthesized image based on the input prompt, where the synthesized image depicts the element of a reference image (comprising a target concept) and an element of the input prompt. During training, the image generation model takes both an input prompt and a reference image as inputs. Template "a photo of a V*<class>" is used for the concepts. For example, the image generation model obtains a text prompt "photo of a V* penguin plushie" and a reference image depicting a penguin plushie (i.e., the target concept). "V*" is the token referring to a specific penguin plushie the model is learning to customize the residuals for.

In some embodiments, the image generation apparatus learns a set of personalized residuals (or customized residuals), subsequently for concept-driven image synthesis. Through low rank adaptation (or LoRA), the image generation apparatus learns a small set of customized residuals to represent the identity of a concept. The image generation apparatus then adds the set of customized residuals to a set of parameters of the image generation model, respectively, to obtain a set of updated parameters. In some examples, a plurality of sets of customized residuals are added to a plurality of different layers of the image generation model at a plurality of different resolutions, respectively. In some examples, the image generation model includes a latent diffusion model.

At inference time, localized attention-guided (or LAG) sampling is used, based on the customized residuals and parameters of the original diffusion model, to generate the target concept and the rest of the output image, respectively. The image generation model computes the attention maps from the cross-attention layers of the diffusion model, which are then used at each timestep to predict the location of the concept in the generated image. The image generation model applies features, produced based on the personalized residuals, exclusively in the predicted region such that the rest of output image (e.g., background and other objects) is generated by the original diffusion model. That is, the set of customized residuals are applied exclusively in regions where the concept is localized via the cross-attention mechanism. By leveraging the attention maps from the tokens denoting the concept, the image generation model can localize the customized residuals so that they do not affect the background of the output image.

The present disclosure describes systems and methods that improve on conventional image generation models by providing more accurate depiction of custom concepts. For example, users can achieve more precise control over the identity of an object in a synthesized image (e.g., an image depicting a specific action figure as shown in FIG. 1). Some embodiments achieve improved accuracy by learning a set of customized residuals based on a reference image during a fine-tuning phase and adding the customized residuals to pre-trained diffusion model parameters.

Systems and methods described in the present disclosure also achieve improved training efficiency. For example, the set of customized residuals represent a small portion compared to base parameters from the pre-trained diffusion model (e.g., about 0.1%). In some cases, fine-tuning a base diffusion model to obtain/learn the set of customized residuals takes approximately 3 minutes to complete in contrast to the expensive process of fine-tuning millions of model parameters. One or more embodiments reduce the number of learnable parameters and remove reliance on domain regularization when tuning a custom image generation model at the fine-tuning phase.

Furthermore, embodiments of the present disclosure ensure that the blending between the concept and the rest of synthesized image (e.g., other objects and image background) is seamless. For example, synthesized images look more coherent and realistic. Localized attention-guided sampling is used to apply the customized residuals exclusively in regions where the concept is localized via cross-attention mechanism. The LAG sampling uniquely combines the learned identity of the concept with the existing generative prior of the base diffusion model by applying the learned residuals exclusively in areas where the concept is localized via cross-attention and applying original diffusion weights in other regions. By leveraging the attention maps from tokens denoting the concept, embodiments of the present disclosure can localize the residuals so that they do not affect the background, which is instead be generated using a base image generator.

In some examples, an image generation apparatus based on the present disclosure obtains a text prompt, and then generates a synthesized image that depicts the element of the reference image (comprising target concept) and an element of the text prompt. Examples of application in concept-driven image generation context are provided with reference to FIGS. 2-6. Details regarding the architecture of an example image generation system are provided with reference to FIGS. 1 and 8-14. Details regarding the image generation process are provided with reference to FIGS. 7 and 15.

Text-to-Image Generation

In FIGS. 1-7, a method, apparatus, and non-transitory computer readable medium for image generation are described. One or more embodiments of the method, apparatus, and non-transitory computer readable medium include obtaining an input prompt; generating, using an image generation model, an intermediate output based on the input prompt by adding a set of customized residuals to a set of parameters of the image generation model, respectively, to obtain a set of updated parameters, wherein the set of customized residuals represents an element of a reference image; and generating, using the image generation model, a synthesized image based on the input prompt and the intermediate output, wherein the synthesized image depicts the element of the reference image and an element of the input prompt.

In some examples, the input prompt includes a token corresponding to the reference image. Some examples of the method, apparatus, and non-transitory computer readable medium further include encoding the input prompt to obtain a text embedding, wherein the intermediate output is generated based on the text embedding. In some examples, the intermediate output is generated by a transformer layer of the image generation model.

Some examples of the method, apparatus, and non-transitory computer readable medium further include generating a foreground map and a background map using an attention layer of the image generation model. Some examples further include generating a first preliminary output using the set of parameters of the image generation model and the background map. Some examples further include generating a second preliminary output using the set of updated parameters and the foreground map. Some examples further include combining the first preliminary output and the second preliminary output.

Some examples of the method, apparatus, and non-transitory computer readable medium further include binarizing an output of the attention layer to obtain the foreground map and the background map.

In some examples, the set of parameters comprises parameters of a one-by-one convolutional block. In some examples, the set of customized residuals is trained based on the reference image. In some examples, the set of customized residuals comprises a low rank adaptation of the set of parameters.

In some examples, a plurality of sets of customized residuals are added to a plurality of different layers of the image generation model at a plurality of different resolutions, respectively. Some examples of the method, apparatus, and non-transitory computer readable medium further include performing a diffusion process on a noise input.

FIG. 1 shows an example of an image generation system according to aspects of the present disclosure. The example shown includes user 100, user device 105, image generation apparatus 110, cloud 115, and database 120. Image generation apparatus 110 is an example of, or includes aspects of, the corresponding element described with reference to FIG. 8.

In an example shown in FIG. 1, an input prompt is provided by user 100 and transmitted to image generation apparatus 110, e.g., via user device 105 and cloud 115. The input prompt is an instruction or command received from user 100. For example, the input prompt is "V* action figure riding a motorcycle". The input prompt includes a token "V*" corresponding to a reference image, e.g., stored in databased 120 or uploaded from user device 105.

At training time, image generation apparatus 110 receives a reference image depicting a target concept. The image generation apparatus 110 learns a set of customized residuals, which encode the identity of the target concept. The customized residuals (a set of learned offsets) are added to a set of parameters of an image generation model, respectively, to obtain a set of updated parameters. The set of customized residuals represents an element of the reference image. In some examples, the set of parameters are from a pre-trained diffusion model. The customized residuals are applied to a subset of weights within the pre-trained diffusion model.

At inference time, image generation apparatus 110 generates a synthesized image based on the input prompt using the set of updated parameters. The synthesized image depicts the element of the reference image and an element of the input prompt. Image generation apparatus 110 returns the synthesized image to user 100 via cloud 115 and user device 105.

User device 105 may be a personal computer, laptop computer, mainframe computer, palmtop computer, personal assistant, mobile device, or any other suitable processing apparatus. In some examples, user device 105 includes software that incorporates an image processing application (e.g., an image generator, an image editing tool). In some examples, the image processing application on user device 105 may include functions of image generation apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image generation apparatus 110 includes a computer implemented network comprising a text encoder and an image generator. Image generation apparatus 110 may also include a processor unit, a memory unit, an I/O module, a user interface, and a training component. The training component is used to train a machine learning model (or an image generation model) comprising a text-to-image diffusion model. Additionally, image generation apparatus 110 can communicate with database 120 via cloud 115. In some cases, the architecture of the image generation network is also referred to as a network, a machine learning model, or a network model. Further detail regarding the architecture of image generation apparatus 110 is provided with reference to FIGS. 8-14. Further detail regarding the operation of image generation apparatus 110 is provided with reference to FIGS. 2, 7 and 15.

In some cases, image generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data (e.g., a training set including one or more reference images for training) in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
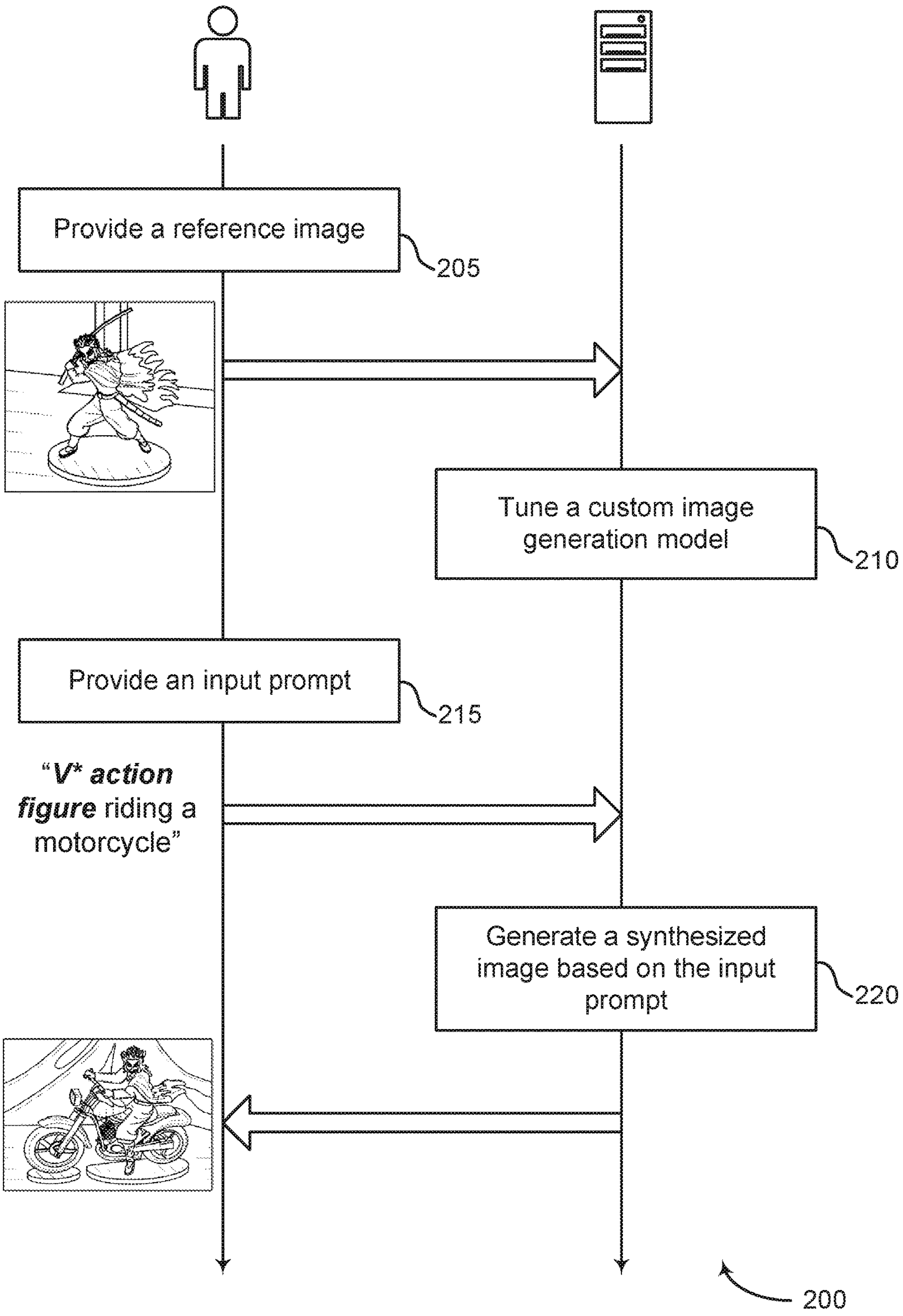
FIGS. 2 and 3 show examples of concept-driven text-to-image generation according to aspects of the present disclosure.

FIG. 2 shows an example of a method 200 for concept-driven text-to-image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a reference image. In some cases, the operations of this step refer to, or may be performed by, a user as described with reference to FIG. 1. In some examples, the reference image includes or depicts an identity of a target concept. As an example shown in FIG. 2, the reference image includes an action figure (i.e., target concept). In some cases, multiple reference images are used to fine-tune a machine learning model (e.g., a diffusion model).

At operation 210, the system tunes a custom image generation model based on the reference image. In some cases, the operations of this step refer to, or may be performed by, a training component as described with reference to FIG. 8. In some embodiments, the system, via a training component, tunes a custom image generation model to learn a set of personalized residuals at training time. The custom image generation model is tuned to learn low-rank residuals for an output projection layer within each transformer block in a diffusion model. The set of personalized residuals contain relatively few parameters, and accordingly it is fast to train the custom image generation model. Additionally, regularization images are not needed during training. In some cases, the set of personalized residuals are also referred to as customized residuals.

At operation 215, the user provides an input prompt to the trained machine learning model. In some cases, the operations of this step refer to, or may be performed by, a user as described with reference to FIG. 1. In the above example, the input prompt is "V* action figure riding a motorcycle". The concept is associated with a unique identifier token (e.g., V*), which is initialized using a rarely occurring token embedding. Here, "action figure" represents the macro class of the concept. During training, the machine learning model uses the unique token and macro class of the concept in a fixed template for the prompt associated with each reference image (e.g., "a photo of a V* macro class").

At operation 220, the system, at inference time, generates a synthesized image based on the input prompt. In some cases, the operations of this step refer to, or may be performed by, an image generation apparatus as described with reference to FIGS. 1 and 8. An image generator such as diffusion model generates the synthesized image by performing a diffusion process on a noise input.

In some cases, the system presents the synthesized image to the user via an image generation apparatus as described with reference to FIGS. 1 and 8. The synthesized image can be further edited using an image editing tool such as Photoshop®.

Figure 3:
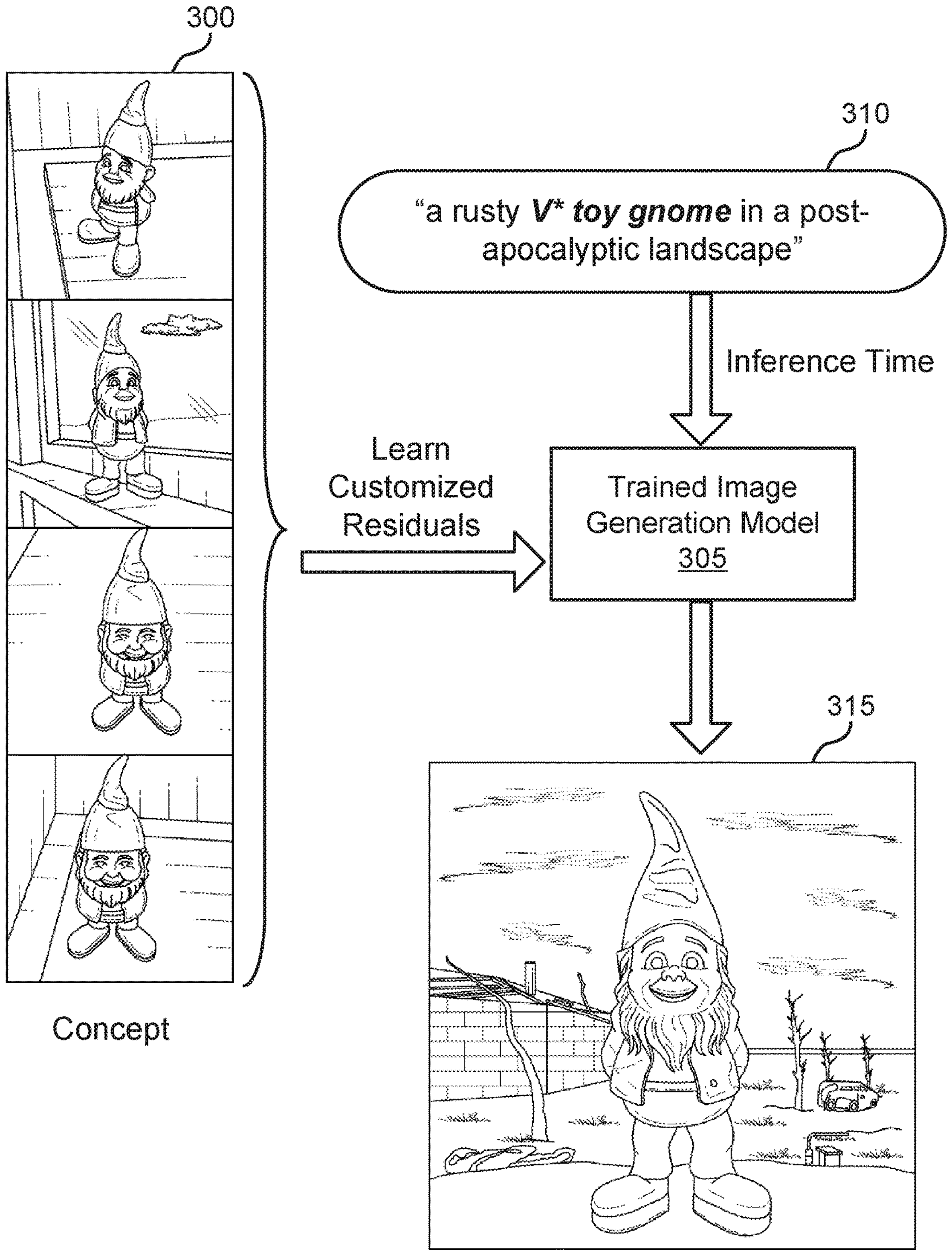

FIG. 3 shows an example of concept-driven text-to-image generation according to aspects of the present disclosure. The example shown includes reference image(s) 300, trained image generation model 305, input prompt 310, and synthesized image 315.

Given a set of reference images 300 depicting a desired concept, personalization methods differ in which parameters they train and whether they are specific to a single concept (i.e., they need to be separately trained for a new concept) or can generalize to new concepts without retraining. To enable personalization of arbitrary concepts, one can finetune the model's parameters or its inputs directly such that it can reconstruct the training data. An image generation model via personalization methods can be applied to any kind of concepts, but the finetuning needs to be done on a per-concept basis and different parameters need to be stored for each.

In some cases, training on multiple reference images 300 enable an image generation model, via customized residuals, to learn a concept's identity and disentangle it from the background (e.g., if reference images are not from a popular domain such as people, dogs, cats, etc.). By adding more reference images, the image generation model can identify the object of interest and view the object of interest from multiple different perspectives/angles.

Some embodiments finetune parameters of an image generation model for a concept so that there are no constraints on the domain. Given a set of reference images 300, the image generation model (with reference to FIG. 8) learns a set of customized residuals (i.e., personalized residuals) for a subset of a pre-trained diffusion model's weights. Then the set of customized residuals are used for concept-driven text-to-image generation.

In an embodiment, at training time, the image generation model learns a set of customized residuals to obtain a trained image generation model 305. The trained image generation model 305 is also referred to as a fine-tuned model. At inference time, trained image generation model 305 receives input prompt 310 and generates synthesized image 315 based on the input prompt 310. For example, input prompt 310 is "a rusty V* toy gnome in a post-apocalyptic landscape". Input prompt 310 is an example of, or includes aspects of, the corresponding element described with reference to FIGS. 4-6, 9, and 10.

In some cases, a user provides reference image(s) 300 of a target concept. Reference image(s) 300 are not used during inference. Reference image(s) 300 is an example of, or includes aspects of, the corresponding element described with reference to FIGS. 4-6, 9, and 10. Trained image generation model 305 is an example of, or includes aspects of, the corresponding element described with reference to FIG. 4.

In some examples, synthesized image 315 depicts the element (e.g., "toy gnome") based on the input prompt 310. In one example, a text prompt at inference is "A V* dog sitting on the beach" where "V*" is the token referring to a specific dog that the image generation model, via fine-tuning, has customized the set of residuals for. Synthesized image 315 is an example of, or includes aspects of, the corresponding element described with reference to FIG. 4.

Figure 4:
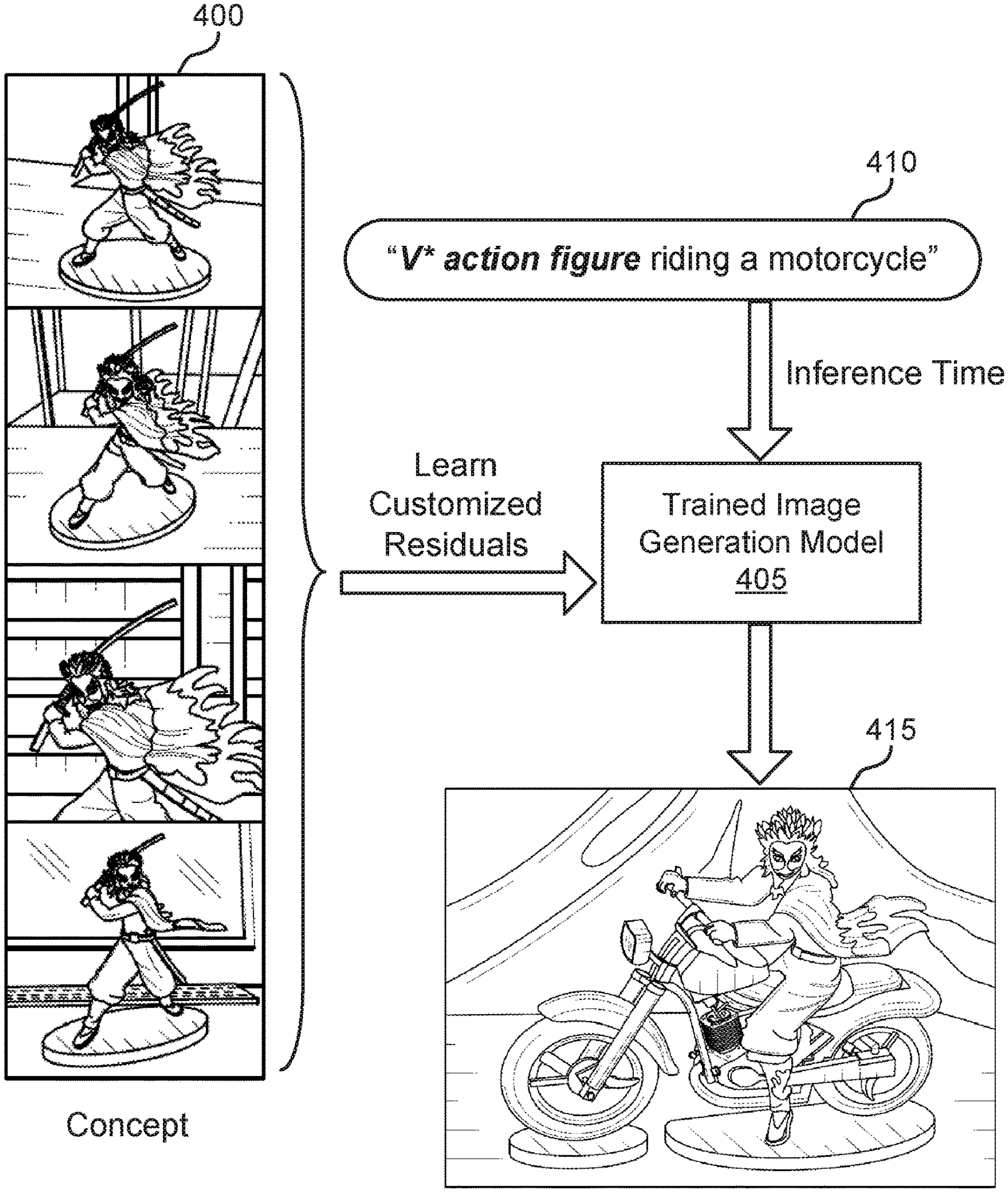
FIG. 4 shows an example of concept-driven text-to-image generation with localized attention-guided sampling according to aspects of the present disclosure.

FIG. 4 shows an example of concept-driven text-to-image generation with localized attention-guided sampling according to aspects of the present disclosure. The example shown includes reference image(s) 400, trained image generation model 405, input prompt 410, and synthesized image 415.

In some embodiments, a set of customized residuals can be combined with localized attention-guided (LAG) sampling, which leverages the cross-attention maps from diffusion models to localize the application of the customized residuals and uses the original, unchanged, diffusion model for generating everything else.

Given a set of reference images 400, the image generation model (with reference to FIG. 8) learns a set of customized residuals (i.e., personalized residuals) for a subset of a pre-trained diffusion model's weights. Then the set of customized residuals are used for concept-driven text-to-image generation.

In an embodiment, at training time, the image generation model learns a set of customized residuals to obtain a trained image generation model 405. The trained image generation model 405 is also referred to as a fine-tuned model. At inference time, trained image generation model 405 receives input prompt 410 and generates synthesized image 415 based on the input prompt 410. For example, input prompt 410 is "V* action figure riding a motorcycle". Input prompt 410 is an example of, or includes aspects of, the corresponding element described with reference to FIGS. 3, 5, 6, 9, and 10.

In some examples, synthesized image 415 depicts the element (e.g., "action figure") based on the input prompt 410. Synthesized image 415 is an example of, or includes aspects of, the corresponding element described with reference to FIG. 3.

In some examples, the input prompt 410 includes a nonce token representing the element (e.g., "action figure") and an additional token representing a target action of the element. The synthesized image 415 depicts the element performing the target action. A nonce token is a unique identifier. "V*" is a nonce token referring to a specific action figure that the image generation model, via fine-tuning, has customized the set of residuals for.

Reference image(s) 400 is an example of, or includes aspects of, the corresponding element described with reference to FIGS. 3, 5, 6, 9, and 10. Trained image generation model 405 is an example of, or includes aspects of, the corresponding element described with reference to FIG. 3.

Figure 5:
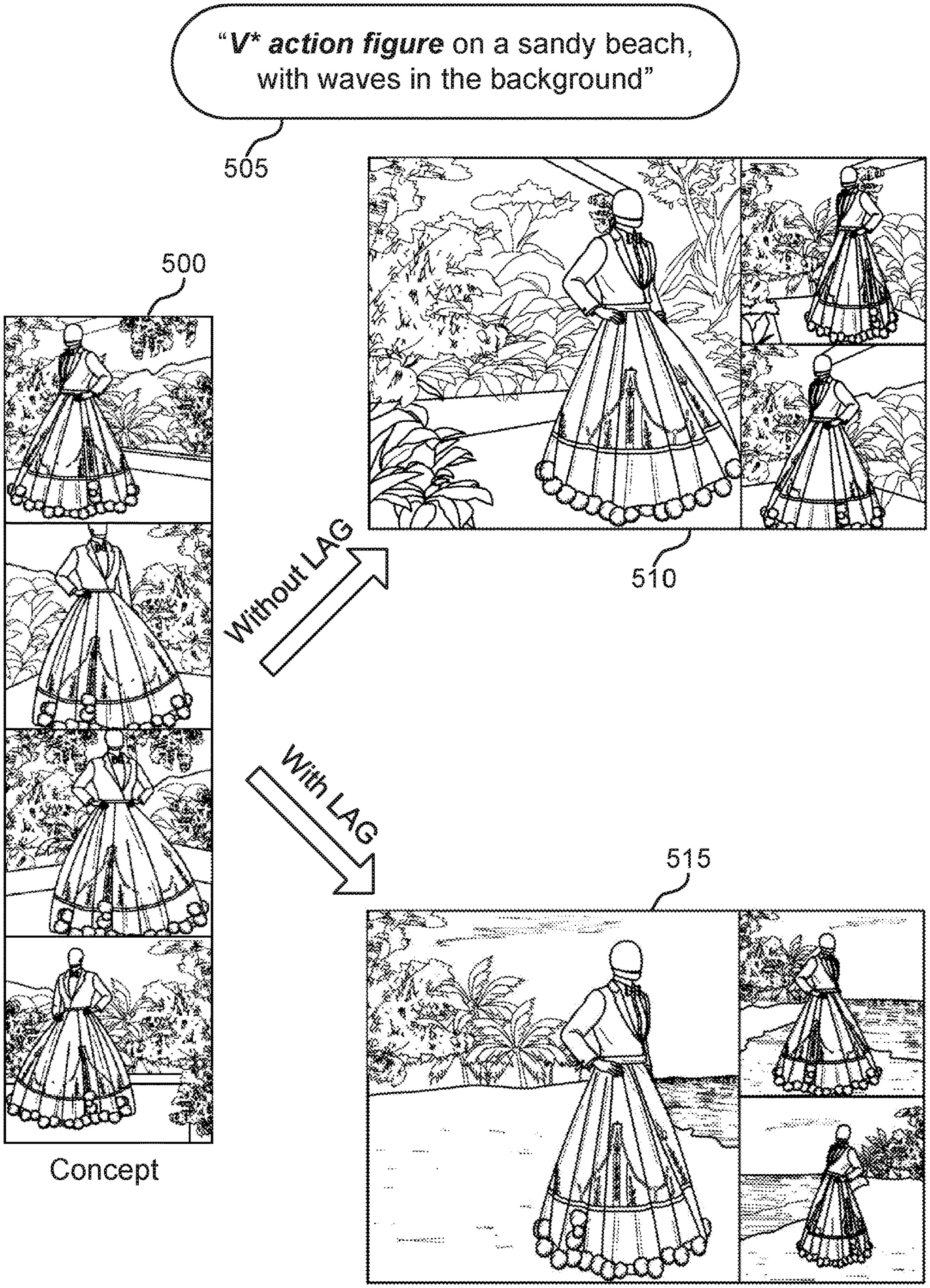
FIGS. 5 and 6 show examples of localized attention-guided sampling effect comparison according to aspects of the present disclosure.

FIG. 5 shows an example of localized attention-guided sampling effect comparison according to aspects of the present disclosure. The example shown includes reference image(s) 500, input prompt 505, a first set of synthesized images 510, and a second set of synthesized images 515.

Figure 6:
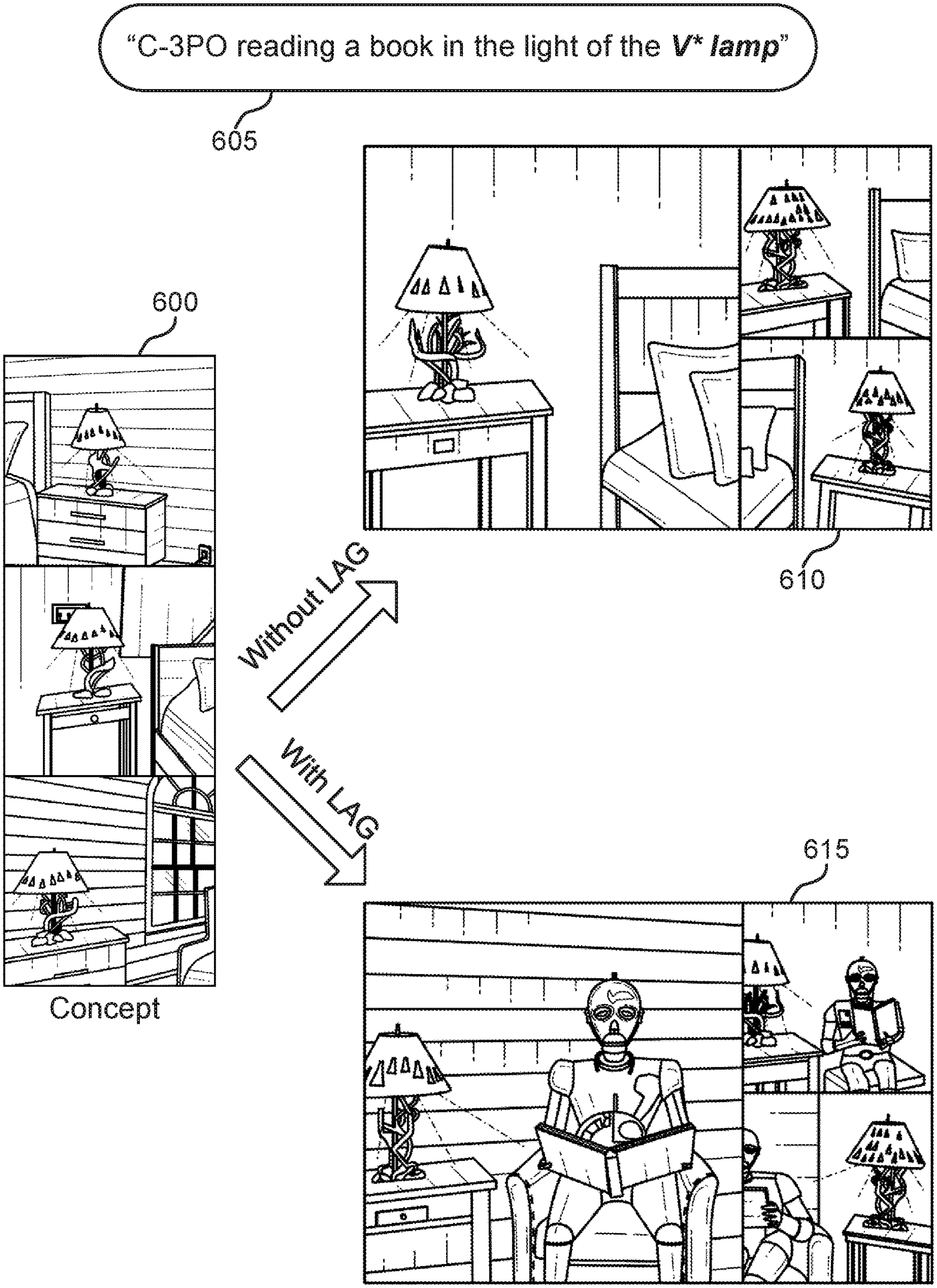

FIGS. 5-6 illustrate examples of comparison using personalized residuals with and without localized attention-guided sampling. The examples illustrate how LAG sampling affects the output image by using the same starting noise map Zr to sample each pair of {w/o LAG, w/LAG} images. LAG sampling generally performs better than normal sampling (e.g., changing scenery/background, adding objects). Artistic styles can benefit from LAG sampling when the texture of the concept is similar to the desired style otherwise the localization causes the texture of the concept to mismatch the rest of the image.

Refer to an example in FIG. 5, reference image(s) 500 include four images that indicate a target concept. Reference image(s) 500 is an example of, or includes aspects of, the corresponding element described with reference to FIGS. 3, 4, 6, 9, and 10. Input prompt 505 is "V* action figure on a sandy beach, with waves in the background". Input prompt 505 includes token "V*" corresponding to reference image(s) 500. Input prompt 505 is an example of, or includes aspects of, the corresponding element described with reference to FIGS. 3, 4, 6, 9, and 10.

The first set of synthesized images 510 are images generated without LAG sampling. The second set of synthesized images 515 are images generated with LAG sampling. An image generation model (with reference to FIG. 8) uses a same starting noise map to generate corresponding pairs of images to directly visualize how LAG sampling affects the output image. LAG produces results that are better aligned with the concept and input prompt 505.

The first set of synthesized images 510 is an example of, or includes aspects of, the corresponding element described with reference to FIG. 6. The second set of synthesized images 515 is an example of, or includes aspects of, the corresponding element described with reference to FIG. 6.

FIG. 6 shows an example of localized attention-guided sampling effect comparison according to aspects of the present disclosure. The example shown includes reference image(s) 600, input prompt 605, a first set of synthesized images 610, and a second set of synthesized images 615.

Refer to an example in FIG. 6, reference image(s) 600 include three images that indicate a target concept. Reference image(s) 600 is an example of, or includes aspects of, the corresponding element described with reference to FIGS. 3-5, 9, and 10. Input prompt 605 is "C-3PO reading a book in the light of the V* lamp". Input prompt 605 includes token "V*" corresponding to reference image(s) 600. Input prompt 605 is an example of, or includes aspects of, the corresponding element described with reference to FIGS. 3-5, 9, and 10.

The first set of synthesized images 610 are images generated without LAG sampling. The second set of synthesized images 615 are images generated with LAG sampling. An image generation model (with reference to FIG. 8) uses a same starting noise map to generate corresponding pairs of images to directly visualize how LAG sampling affects the output image. LAG produces results that are better aligned with the concept and input prompt 505.

The first set of synthesized images 610 is an example of, or includes aspects of, the corresponding element described with reference to FIG. 5. The second set of synthesized images 615 is an example of, or includes aspects of, the corresponding element described with reference to FIG. 5.

Figure 7:
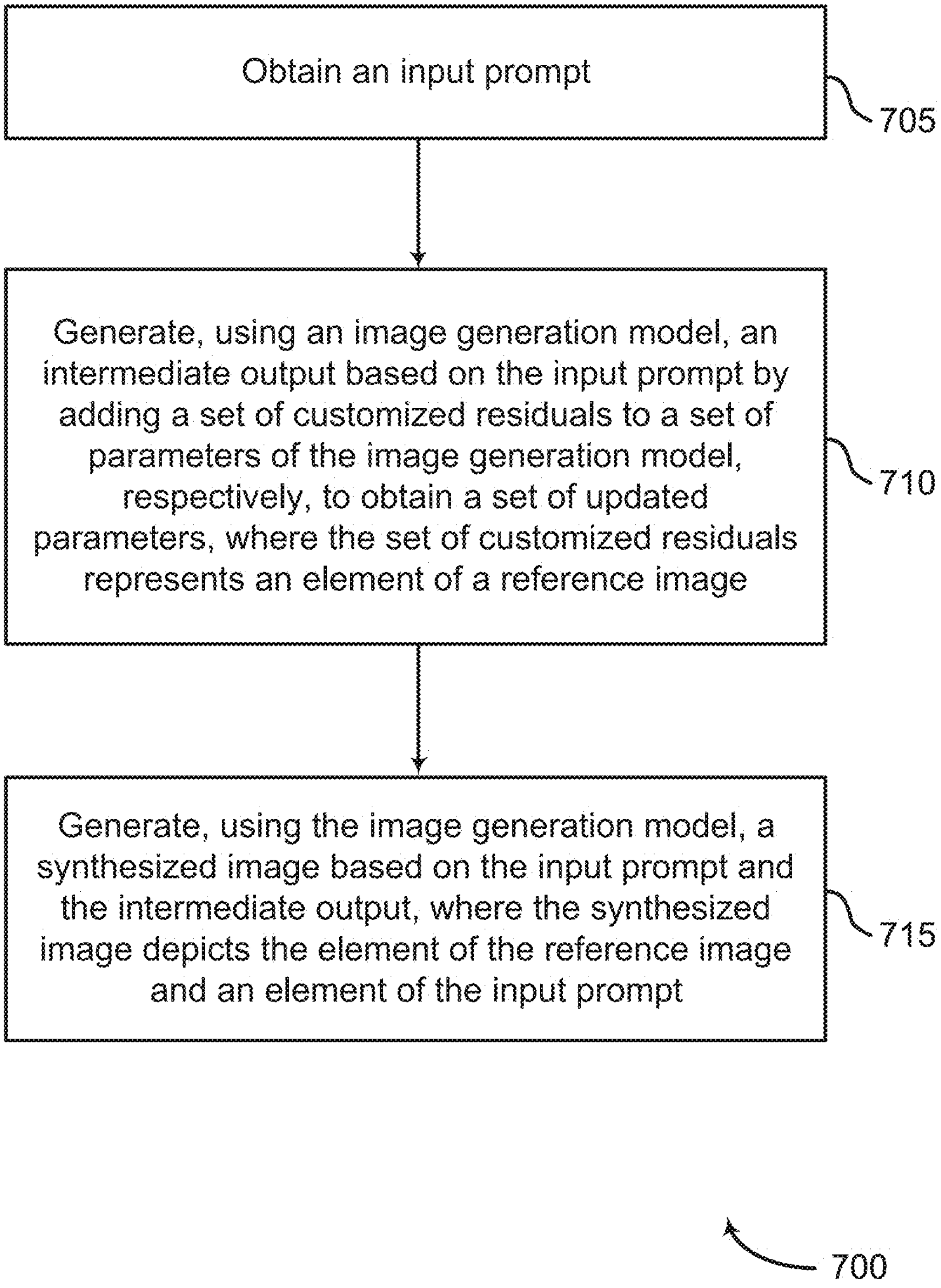
FIG. 7 shows an example of a method for image generation according to aspects of the present disclosure.

FIG. 7 shows an example of a method 700 for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains an input prompt. In some cases, the operations of this step refer to, or may be performed by, an image generation model as described with reference to FIGS. 8, and 10-12. In some examples, an input prompt includes a text prompt, e.g., "V* action figure riding a motorcycle". The identifier token "V*" of the input prompt corresponds to a reference image. The reference image is used during training. The reference image depicts a target concept, which is desired in synthesized images. The phrase "action figure" corresponds to a macro class of the concept.

At operation 710, the system generates, using an image generation model, an intermediate output based on the input prompt by adding a set of customized residuals to a set of parameters of the image generation model, respectively, to obtain a set of updated parameters, where the set of customized residuals represents an element of a reference image. In some cases, the operations of this step refer to, or may be performed by, an image generation model as described with reference to FIGS. 8, and 10-12.

In some embodiments, "customized residuals" are determined based on a model that is fine-tuned to generate a custom object (i.e., the element of the reference image). For example, one or more parameters of a base model can be fine-tuned to faithfully capture the identity of a target concept such that the concept can be re-contextualized into new settings. A concept is learned using one or more reference images (i.e., not many reference images are used to learn the concept). In some cases, the residuals are directly optimized during the fine-tuning process. In other examples, parameters of the updated model are learned and the customized residuals are determined based on a difference between the updated model and the base model. Thus, the residuals can be added to the base model to achieve the performance of the fine-tuned model.

In some examples, multiple updated models and multiple different sets of customized residuals are prepared prior to receiving an input prompt from a user. After the input prompt is received, a set of residuals can be selected based on the prompt. For example, if the input prompt requests an image that depicts a particular custom object, residuals corresponding to a model trained to generate images including that object can be selected.

In some examples, an image generation model includes a text-to-image latent diffusion model. The image generation model is trained using a diffusion loss function, e.g., $\mathcal{L}_{LDM}$. That is, the pre-trained image generation model includes a set of parameters. The set of parameters are also known as original weight matrix of the diffusion model. The set of parameters correspond to a layer of the diffusion model. Accordingly, a plurality of sets of parameters correspond to a plurality of different layers of the image generation model at a plurality of different resolutions, respectively.

The set of customized residuals encode the identity of the target concept. The set of customized residuals are added to the set of parameters of the image generation model, respectively, to obtain a set of updated parameters. That is, a set of learned offsets, via low rank adaptation or LoRA, are applied to a subset of weights within the pre-trained diffusion model. The number of learnable parameters is reduced.

At operation 715, the system generates, using the image generation model, a synthesized image based on the input prompt and the intermediate output, where the synthesized image depicts the element of the reference image and an element of the input prompt. In some cases, the operations of this step refer to, or may be performed by, an image generation model as described with reference to FIGS. 8, and 10-12.

In an embodiment, generating the intermediate output includes steps of generating a foreground map and a background map using an attention layer of the image generation model; generating a first preliminary output using the set of parameters of the image generation model and the background map; generating a second preliminary output using the set of updated parameters and the foreground map; and combining the first preliminary output and the second preliminary output. In some cases, the intermediate output is denoted as $\hat{f}_i$. The intermediate output is an output from a transformer block i of the image generation model.

At inference time, localized attention-guided sampling (or LAG sampling) leverages attention maps to localize where the customized residuals are applied. A synthesized image is generated by leveraging both the base diffusion model and the set of customized residuals. The identity represented through the customized residuals is applied exclusively in the regions corresponding to the target concept, and the remaining regions are generated by the original diffusion model.

Network Architecture

In FIGS. 8-14, an apparatus and method for image generation are described. One or more embodiments of the apparatus and method include at least one processor; at least one memory including instructions executable by the at least one processor; and an image generation model comprising parameters in the at least one memory and trained to generate an intermediate output based on an input prompt by adding a set of customized residuals to a set of parameters of the image generation model, respectively, to obtain a set of updated parameters, wherein the set of customized residuals represents an element of a reference image and to generate a synthesized image based on the input prompt and the intermediate output, wherein the synthesized image depicts the element of the reference image and an element of the input prompt.

In some examples, the image generation model comprises a diffusion model. In some examples, the set of parameters comprises a projection block of a transformer layer. Some examples of the apparatus and method further include a text encoder trained to encode the input prompt.

Figure 8:
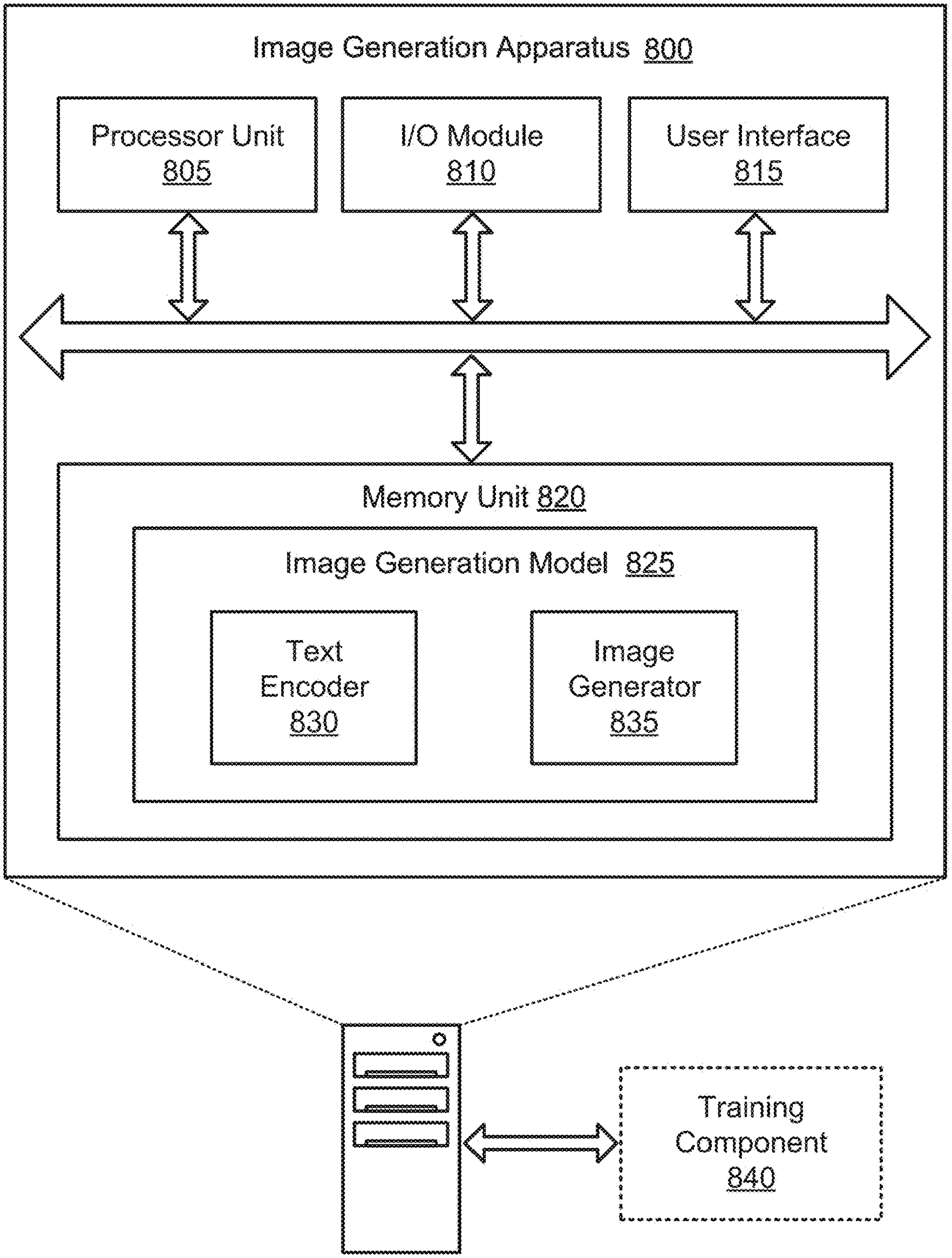
FIG. 8 shows an example of an image generation apparatus according to aspects of the present disclosure.

FIG. 8 shows an example of an image generation apparatus 800 according to aspects of the present disclosure. The example shown includes image generation apparatus 800, processor unit 805, I/O module 810, user interface 815, memory unit 820, image generation model 825, and training component 840. Image generation apparatus 800 is an example of, or includes aspects of, the corresponding element described with reference to FIG. 1.

Processor unit 805 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 805 is configured to operate a memory array using a memory controller. In other cases, a memory controller is integrated into the processor. In some cases, processor unit 805 is configured to execute computer-readable instructions stored in a memory to perform various functions. In some embodiments, processor unit 805 includes special purpose components for modem processing, baseband processing, digital signal processing, or transmission processing.

Examples of memory unit 820 include random access memory (RAM), read-only memory (ROM), or a hard disk. Examples of memory unit 820 include solid state memory and a hard disk drive. In some examples, memory unit 820 is used to store computer-readable, computer-executable software including instructions that, when executed, cause a processor to perform various functions described herein. In some cases, memory unit 820 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 820 store information in the form of a logical state.

In some examples, at least one memory unit 820 includes instructions executable by the at least one processor unit 805. Memory unit 820 includes image generation model 825 or stores parameters of image generation model 825.

I/O module 810 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 810 includes a user interface 815. A user interface 815 may enable a user to interact with a device. In some embodiments, the user interface 815 may include an audio device, such as an external speaker system, an external display device such as a display screen, or an input device (e.g., remote control device interfaced with the user interface 815 directly or through an I/O controller module). In some cases, a user interface 815 may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 800 includes a computer implemented artificial neural network (ANN) for image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

Accordingly, during the training process, the parameters and weights of the image generation model 825 are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image generation apparatus 800 includes a convolutional neural network (CNN) for image generation. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, image generation model 825 obtains an input prompt. In some examples, image generation model 825 generates an intermediate output based on the input prompt by adding a set of customized residuals to a set of parameters of the image generation model 825, respectively, to obtain a set of updated parameters, where the set of customized residuals represents an element of a reference image. Image generation model 825 generates a synthesized image based on the input prompt and the intermediate output, where the synthesized image depicts the element of the reference image and an element of the input prompt.

In some examples, the input prompt includes a token corresponding to the reference image. In some examples, the intermediate output is generated by a transformer layer of the image generation model 825.

In some examples, image generation model 825 generates a foreground map and a background map using an attention layer of the image generation model 825. Image generation model 825 generates a first preliminary output using the set of parameters of the image generation model 825 and the background map. Image generation model 825 generates a second preliminary output using the set of updated parameters and the foreground map. Image generation model 825 combines the first preliminary output and the second preliminary output.

In some examples, image generation model 825 binarizes an output of the attention layer to obtain the foreground map and the background map. In some examples, the set of parameters includes parameters of a one-by-one convolutional block. In some examples, the set of customized residuals is trained based on the reference image. In some examples, the set of customized residuals includes a low rank adaptation of the set of parameters. In some examples, a plurality of sets of customized residuals are added to a plurality of different layers of the image generation model 825 at a plurality of different resolutions, respectively.

According to some embodiments, image generation model 825 is trained to generate an intermediate output based on an input prompt by adding a set of customized residuals to a set of parameters of the image generation model 825, respectively, to obtain a set of updated parameters, wherein the set of customized residuals represents an element of a reference image and to generate a synthesized image based on the input prompt and the intermediate output, wherein the synthesized image depicts the element of the reference image and an element of the input prompt.

In some examples, the image generation model 825 includes a diffusion model. In some examples, the set of parameters includes a projection block of a transformer layer. Image generation model 825 is an example of, or includes aspects of, the corresponding element described with reference to FIGS. 10-12.

In one embodiment, image generation model 825 includes text encoder 830 and image generator 835. Text encoder 830 encodes the input prompt to obtain a text embedding, where the intermediate output is generated based on the text embedding. Text encoder 830 is an example of, or includes aspects of, the corresponding element described with reference to FIGS. 9 and 10. In some examples, image generator 835 performs a diffusion process on a noise input.

According to some embodiments, training component 840 obtains a reference image. In some examples, training component 840 trains image generation model 825 to generate images depicting an element of the reference image by learning a set of customized residuals that are added to a set of parameters of the image generation model 825, where the set of customized residuals represents the element of the reference image. In some examples, the image generation model 825 includes a pre-trained model and the set of parameters of the image generation model 825 are fixed while learning the set of customized residuals.

In some examples, training component 840 computes a diffusion loss based on the reference image. Training component 840 updates the set of customized residuals based on the diffusion loss. In some examples, training component 840 learns a set of sets of customized residuals that are added to a set of different layers of the image generation model 825 at a set of different resolutions, respectively. In some cases, training component 840 (shown in dashed line) is implemented on an apparatus other than image generation apparatus 800.

Figure 9:
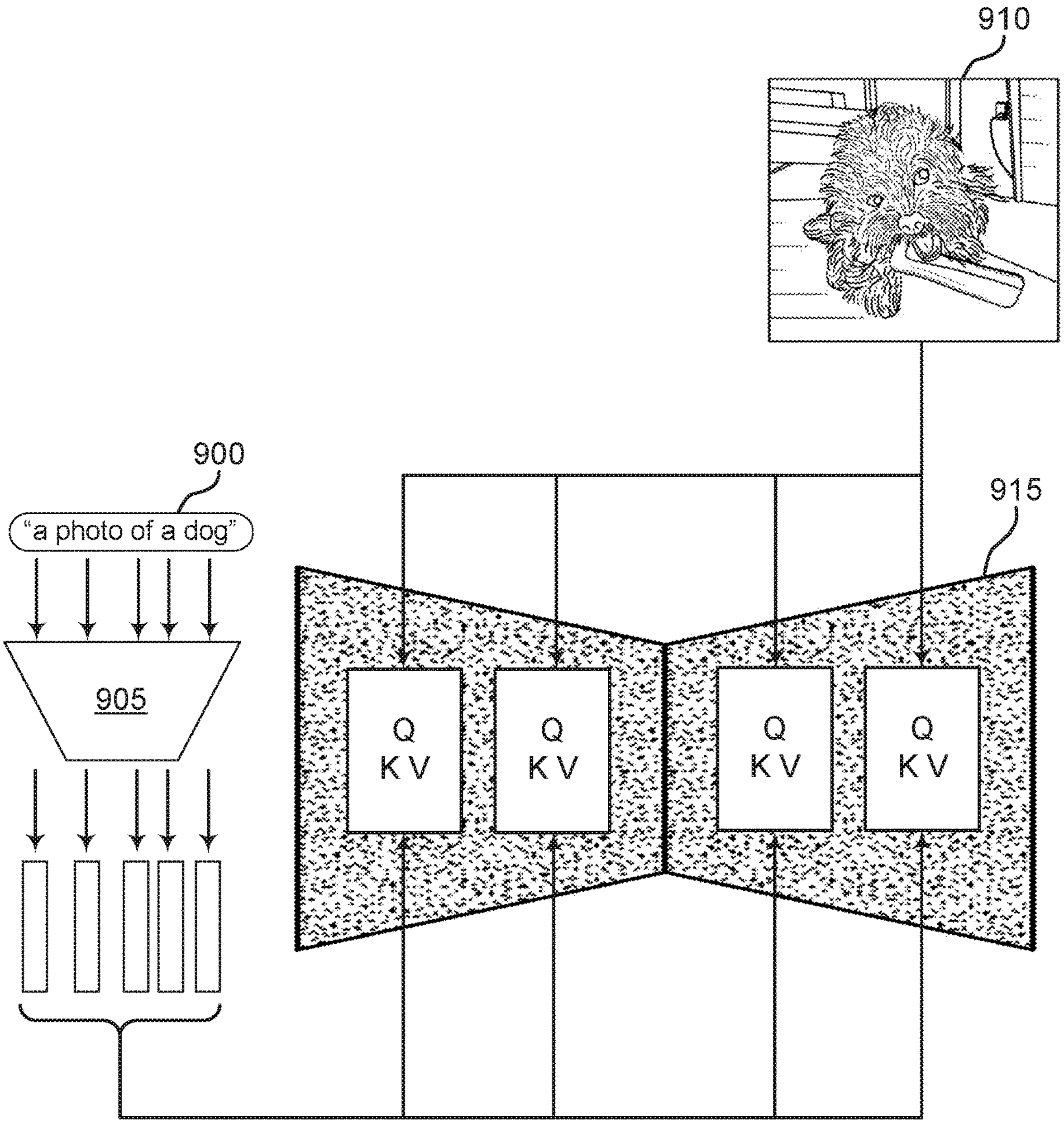
FIG. 9 shows an example of an image generation model according to aspects of the present disclosure.

FIG. 9 shows an example of an image generation model according to aspects of the present disclosure. The example shown includes input prompt 900, text encoder 905, reference image 910, and diffusion model 915.

In some embodiments, an image generation model incorporates personalized residuals and localized attention-guided sampling for concept-driven generation. The image generation model includes diffusion model 915 which is a text-to-image generative model. The image generation model takes input prompt 900 as input. For example, input prompt 900 is "a photo of a dog". Text encoder 905 encodes the input prompt 900 to obtain a text embedding. The text embedding is then fed to diffusion model 915. Diffusion model 915 obtains reference image 910 (corresponding to a concept) as input.

The image generation model represents concepts by freezing the weights of a pre-trained text-conditioned diffusion model 915 and is configured to learn low-rank residuals for a small subset of the model's layers. The residual-based method directly enables application of a sampling technique, which applies the learned customized residuals in areas where the concept is localized via cross-attention and applies the original diffusion weights in other regions. Localized attention-guided sampling combines the learned identity of the concept with the existing generative prior of the underlying diffusion model 915.

Personalized residuals (also known as customized residuals) effectively capture the identity of a concept in ~3 minutes on a single GPU without the use of regularization images and with fewer parameters, and localized sampling applies the original diffusion model as strong prior for a large portion of a synthesized image.

Input prompt 900 is an example of, or includes aspects of, the corresponding element described with reference to FIGS. 3-6, and 10. Text encoder 905 is an example of, or includes aspects of, the corresponding element described with reference to FIGS. 8 and 10. Reference image 910 is an example of, or includes aspects of, the corresponding element described with reference to FIGS. 3-6, and 10.

Figure 10:
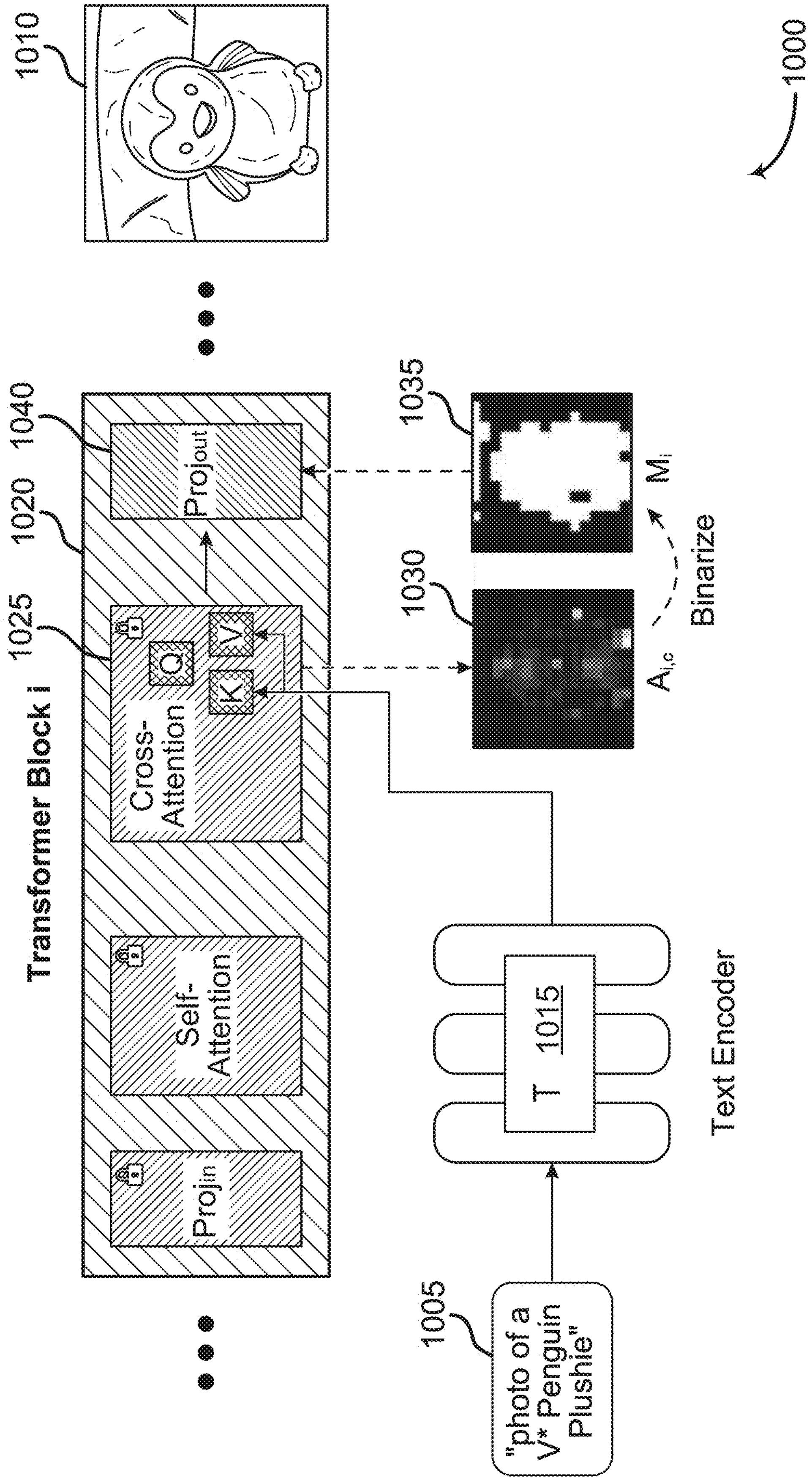
FIG. 10 shows an example of a transformer block of an image generation model according to aspects of the present disclosure.

FIG. 10 shows an example of a transformer block of an image generation model 1000 according to aspects of the present disclosure. The example shown includes image generation model 1000, input prompt 1005, reference image 1010, text encoder 1015, transformer layer 1020, cross-attention layer 1025, attention map 1030, output map 1035, and projection block 1040. Image generation model 1000 is an example of, or includes aspects of, the corresponding element described with reference to FIGS. 8, 11, and 12.

The goal of personalizing text-to-image models is to faithfully capture the identity of a target concept while simultaneously avoiding overfitting so that the concept can be re-contextualized into new settings and configurations. Because a concept is often learned using one or more reference images, directly fine-tuning the weights of a large generative model may lead to overfitting and/or overwriting unnecessary parts of the learned language prior.

In some embodiments, image generation model 1000 uses LoRA-based method to learn low-rank offsets for a small subset of the diffusion model weights which represent the target concept while better preserving the existing prior. In some examples, image generation model 1000 includes a diffusion model. The diffusion model contains multiple transformer blocks (e.g., transformer layer 1020 is one transformer block from the multiple transformer blocks). Transformer layer 1020 comprises self-attention layers and cross-attention layers (cross-attention layer 1025) with a 1×1 conv projection layer on either end. For example, a projection block is located at one end and projection block 1040 is located on the other end.

Image generation model 1000 learns offsets for the output projection convolutional layers because these localized operations can capture finer details than the global operations of cross-attention. In some cases, convolutional layers may also be referred to as conv layers. Projection block 1040 is an example of, or includes aspects of, the corresponding element described with reference to FIG. 11.

In an embodiment, image generation model 1000 includes performing a fixed forward noising process that gradually adds noise to an image, and performing a learned denoising process that iteratively removes noise to produce a valid image. The denoising process is learned through a U-Net $\in_\theta$, parameterized by θ, and is conditioned on an image $x_t$ noised to timestep t, and t itself. Text encoder 1015 receives input prompt 1005 and encodes input prompt 1005 to obtain a text embedding, where the intermediate output is generated based on the text embedding. The input prompt 1005 includes a token corresponding to the reference image 1010. In some examples, text guidance is incorporated through conditioning on text embeddings $c=\tau(y)$ of input prompts y from a text encoder τ, such as CLIP.

CLIP (Contrastive Language-Image Pre-Training) model is a neural network trained on a variety of image-text pairs. CLIP encoder converts a text prompt into text representations (a text embedding) in a same embedding space as image embeddings (embeddings that derive from training images and used to construct image embeddings). Therefore, text representations can interact and have the same clustering as that of images from which the machine learning model obtains image embeddings. CLIP is a multi-modal model capable of understanding images and text jointly. CLIP is trained to predict which textual descriptions are most likely to be associated with a given image and vice versa.

In an embodiment, image generation model 1000 associates the concept with a unique identifier token (e.g., V*), which is initialized using a rarely occurring token embedding. During training, image generation model 1000 uses the unique token and macro class of the concept in a fixed template for an input prompt 1005 associated with each reference image (e.g., "a photo of a V* macro class"). For example, input prompt 1005 is a text prompt ("photo of a V* Penguin Plushie").

Personalization methods often involve direct updates to the diffusion model's weights are susceptible to overwriting parts of the existing generative prior with the new concept and thus explicitly need "prior preservation" through regularization images during training. Since embodiments of the present disclosure do not directly update the diffusion model, methods described in the present disclosure avoid this issue and eliminates the burden on the user to determine an effective set of regularization images. Additionally, the low-rank constraint on the residuals reduces the number of trainable parameters, resulting in a simpler and more efficient approach for personalization.

In an embodiment, image generation model 1000 includes Stable Diffusion, which is a text-conditioned latent diffusion model (LDM). An LDM is a variant of a diffusion model that operates in the latent space of a variational autoencoder. An encoder $\varepsilon$ of image generation model 1000 embeds an input image x into a latent representation $z=\varepsilon(x)$. A decoder $\mathcal{D}$ of image generation model 1000 maps z back into pixel space $x'=\mathcal{D}(z)$. The diffusion portion of LDM operates on z and is trained using a loss function $\mathcal{L}_{LDM}$ as follows:

$$\mathcal{L}_{LDM} = \mathbb{E}_{z\sim\mathcal{E}(x),y,\epsilon\sim\mathcal{N}(0,1),t}\left[\|\epsilon-\epsilon_\theta(z_t, t, \tau(y))\|_2^2\right] \quad (1)$$

FIG. 10 illustrates an example of a process for learning a set of personalized residuals. Given a pre-trained text-to-image diffusion model containing L transformer blocks, some embodiments of the present disclosure learn $\Delta W_i = A_i B_i \in \mathbb{R}^{m_i \times m_i}$ for the output projection layer $l_{proj\_out,i}$ with weight matrix $W_i \in \mathbb{R}^{m_i \times m_i \times 1}$ within each transformer block i, where $A_i \in \mathbb{R}^{m_i \times r_i}$ and $B_i \in \mathbb{R}^{r_i \times m_i}$, Image generation model 1000 is configured to reshape the residuals such that $\Delta W_i \in \mathbb{R}^{m_i \times m_i \times 1}$ and add to the original weights $W_i$ to produce $$W_i' = W_i + \Delta W_i.$$

The $\Delta W_i$'s are updated using the original diffusion objective in Eq. (1). A set of customized residuals or personalized residuals are denoted as $\Delta W_i$ for transformer block i. Here, projection block 1040 of transformer layer 1020 is referred to as output projection layer $l_{proj\_out,i}$ within each transformer block i.

In some examples, an output from cross-attention layer 1025 is fed to projection block 1040. Output map 1035 is input to projection block 1040. In some examples, projection block 1040 is configured for customization based on reference image 1010.

With residual-based personalization method, image generation model 1000 is equipped with flexibility in how the offsets are applied at inference. Localized attention-guided (LAG) sampling method can combine a newly learned concept with the original generative prior of the diffusion model. Within a transformer block i (i.e., transformer layer 1020) of the diffusion model, there is cross-attention layer 1025, which learns the correspondence between text tokens and image regions. Each cross-attention layer 1025 is configured to compute attention maps $A_{y_i}$ for each token $y_i$ in input prompt 1005, indicating where the token would affect the generated image. The attention maps 1030 are computed as follows:

$$A(Q, K) = softmax\left(\frac{QK^T}{\sqrt{d_k}}\right) \quad (2)$$

where $Q=W^Q x$ is the query, $K=W^K y$ is the key, and $d_k$ is the dimension of the query and key.

In some cases, transformer layer 1020 may be referred to as a transformer block. Input prompt 1005 is an example of, or includes aspects of, the corresponding element described with reference to FIGS. 3-6, and 9. Text encoder 1015 is an example of, or includes aspects of, the corresponding element described with reference to FIGS. 8 and 9. Reference image 1010 is an example of, or includes aspects of, the corresponding element described with reference to FIGS. 3-6, and 9.

Figure 11:
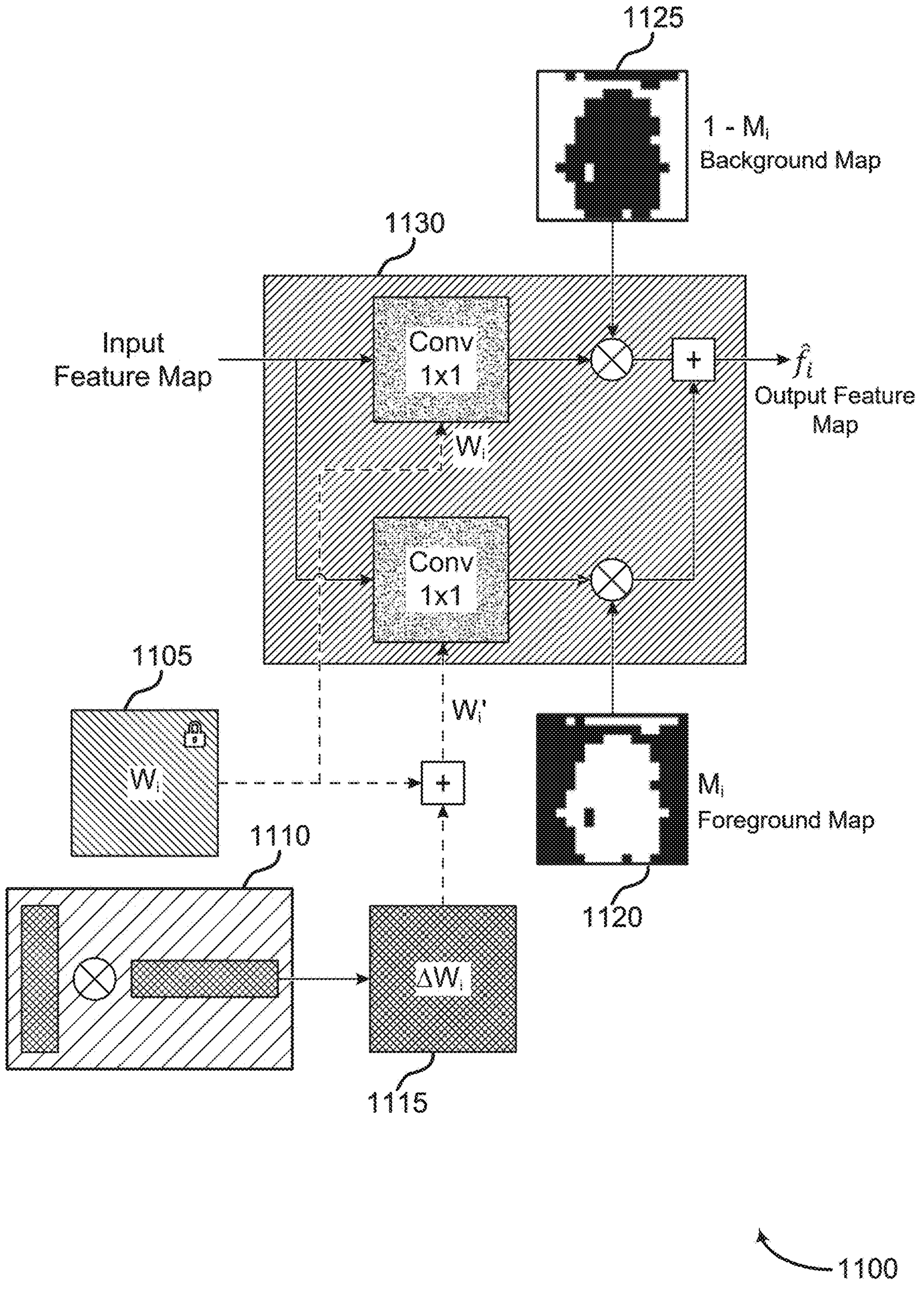
FIGS. 11 and 12 show examples of localized attention-guided sampling architecture according to aspects of the present disclosure.

FIG. 11 shows an example of localized attention-guided sampling architecture according to aspects of the present disclosure. The example shown includes image generation model 1100, a set of parameters 1105, matrices product 1110, a set of customized residuals 1115, foreground map 1120, background map 1125, and projection block 1130. Image generation model 1100 is an example of, or includes aspects of, the corresponding element described with reference to FIGS. 8, 10, and 12.

In an embodiment, a localized attention-guided sampling model (shown in FIG. 11) is configured to optionally apply personalized residuals exclusively in the areas that the cross-attention layers have localized the concept via predicted attention maps. Accordingly, image generation model 1100 combines the newly learned concept with the original generative prior of a base diffusion model within an image.

In some embodiments, image generation model 1100 applies low rank adaptation (LoRA) method. LoRA can be used to update large language models through learned residuals instead of directly finetuning their parameters. For a given layer of the pre-trained model with weight matrix $W_0 \in \mathbb{R}^{m \times n}$, image generation model 1100, via LoRA, learns two matrices A and B whose product forms a residual $\Delta W = AB \in \mathbb{R}^{m \times n}$, where $A \in \mathbb{R}^{m \times r}$, $B \in \mathbb{R}^{r \times n}$, and $r \ll \min(m, n)$ is the rank. The updated weight matrix is then defined as $W' = W_0 + \Delta W$. With small values of r, LoRA has been shown to significantly reduce the number of learnable parameters while retaining or improving performance. In some cases, a set of parameters 1105 is also denoted as $W_i$. Matrices product 1110 is also denoted as AB.

FIG. 11 illustrates a process of learning personalized residuals (i.e., a set of customized residuals 1115). Given a pre-trained text-to-image diffusion model containing L transformer blocks, some embodiments learn $\Delta W_i = A_i B_i \in \mathbb{R}^{m_i \times m_i}$ for the output projection layer $l_{proj\_out,i}$ with weight matrix $W_i \in \mathbb{R}^{m_i \times m_i \times 1}$ within each transformer block i, where $A_i \in \mathbb{R}^{m_i \times r_i}$ and $B_i \in \mathbb{R}^{r_i \times m_i}$. Image generation model 1100 is configured to reshape the residual such that $\Delta W_i \in \mathbb{R}^{m_i \times m_i \times 1}$ and add to the original weights $W_i$ to produce $$W_i' = W_i + \Delta W_i.$$

The $\Delta W_i$'s are updated using the original diffusion objective in Equation (1). In some cases, an output projection layer is also referred to as a projection block.

In some examples, manually provided object masks or specific training are not needed to enable LAG sampling. Additionally, LAG sampling explicitly merges the features of two layers (personalized/finetuned and original/non-finetuned) on-the-fly based on the cross-attention maps obtained during inference and has negligible impact on sampling speed.

The set of parameters 1105 is an example of, or includes aspects of, the corresponding element described with reference to FIG. 12. Foreground map 1120 is an example of, or includes aspects of, the corresponding element described with reference to FIG. 12. Background map 1125 is an example of, or includes aspects of, the corresponding element described with reference to FIG. 12. Projection block 1130 is an example of, or includes aspects of, the corresponding element described with reference to FIG. 10.

Figure 12:
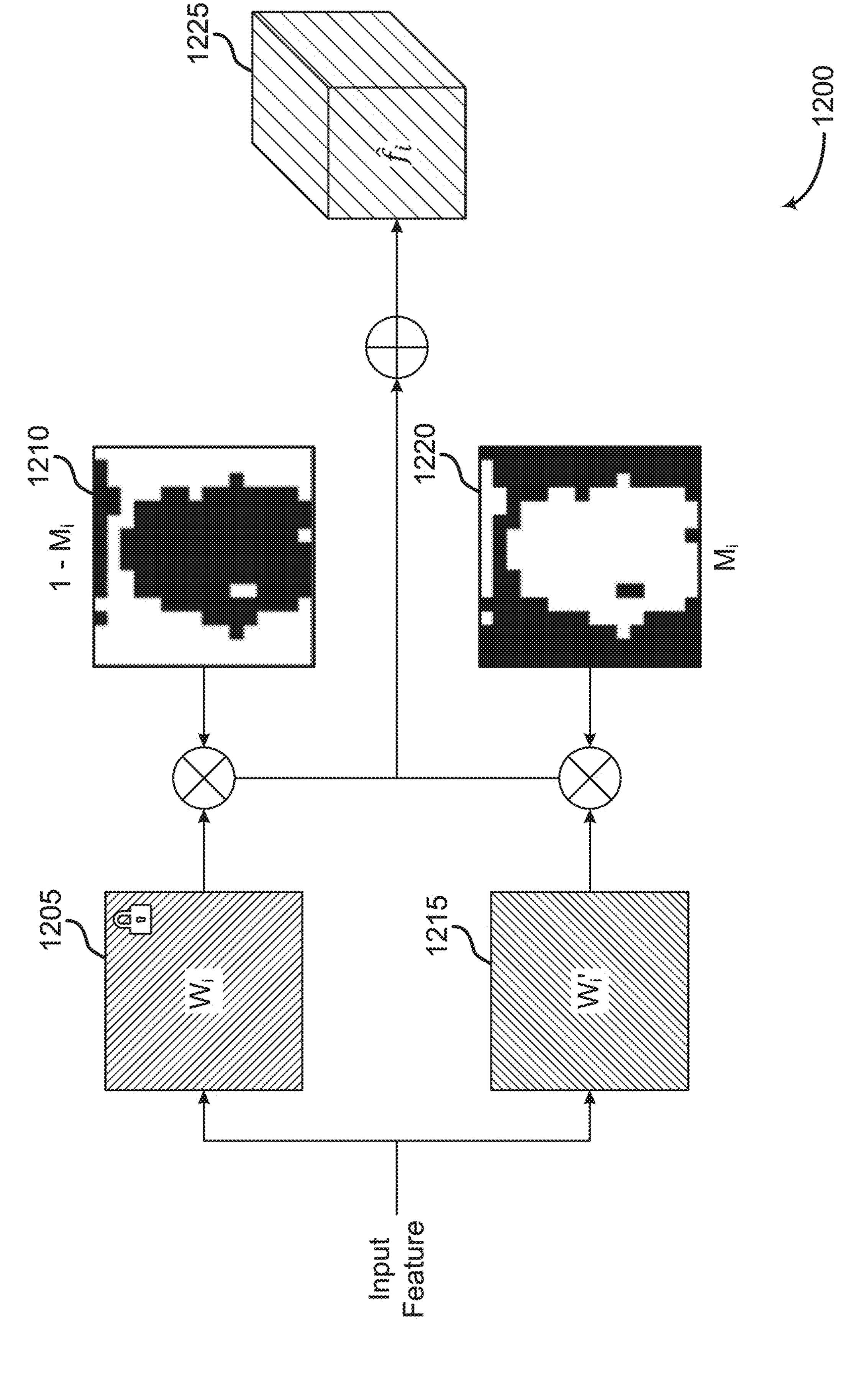

FIG. 12 shows an example of localized attention-guided sampling architecture according to aspects of the present disclosure. The example shown includes image generation model 1200, set of parameters 1205, background map 1210, set of updated parameters 1215, foreground map 1220, and intermediate output 1225. Image generation model 1200 is an example of, or includes aspects of, the corresponding element described with reference to FIGS. 8, 10, and 11.

In some embodiments, given the indices $\mathcal{C}$ of the unique identifier and macro class tokens specifying the concept (e.g., "V*" and "dog"), image generation model 1200 is configured to sum the values of the corresponding attention maps $A_{i,\mathcal{C}} = \sum_{j \in \mathcal{C}} A_j$ in transformer block i, and then binarize using its median value to get $M_i = \text{binarize}(A_{i,\mathcal{C}})$. The binarization of the attention map can refer to the process of determining whether each value is above a threshold value. For example, the attention map can be binarized by determining whether each value is above or below the median value of the attention map. If the original value is below the threshold the binarized value can be set to zero and if the original value is above the threshold the binarized value can be set to one.

Next, image generation model 1200 computes the output feature $\hat{f}_i$ of each transformer block i as:

$$\hat{f}_i = (1 - M_i) \otimes f_i + M_i \otimes f_i' \tag{3}$$

where $f_i = W_i x$ is the feature produced using the original conv weight $W_i$, and $$f_i' = W_i' x$$

is the feature produced using the updated weight from the personalized residual $$W_i' = W_i + \Delta W_i.$$

Personalized residual is denoted as $\Delta W_i$. In some cases, the original conv weight $W_i$ is also referred to as base parameter(s).

$$W_i'$$

is also referred to as updated parameter(s). In the above Equation (3), the term $(1-M_i) \otimes f_i$ is referred to as a first preliminary output. The term $$M_i \otimes f_i'$$

is referred to as a second preliminary output.

In some cases, the set of parameters 1205 are denoted as $W_i$. The set of customized residuals (also known as personalized residuals) are denoted as $\Delta W_i$. The set of updated parameters 1215 are denoted as $$W_i'.$$

Background map 1210' is denoted as $1-M_i$. Foreground map 1220 is denoted as $M_i$. Intermediate output 1225 (also known as output feature map) is denoted as $\hat{f}_i$.

In an embodiment, image generation model 1200 generates a foreground map and a background map using an attention layer of image generation model 1200. Image generation model 1200 generates a first preliminary output using the base parameter and the background map 1210. Image generation model 1200 generates a second preliminary output using the updated parameter and the foreground map 1220. Image generation model 1200 combines the first preliminary output and the second preliminary output to obtain intermediate output 1225.

Accordingly, the identity represented through the personalized residuals is being applied exclusively in the regions corresponding to the target concept, and the remaining regions are generated by the original diffusion model. The described LAG sampling method is visualized in examples FIGS. 5-6.

Set of parameters 1205 is an example of, or includes aspects of, the corresponding element described with reference to FIG. 11. Background map 1210 is an example of, or includes aspects of, the corresponding element described with reference to FIG. 11. Foreground map 1220 is an example of, or includes aspects of, the corresponding element described with reference to FIG. 11.

Figure 13:
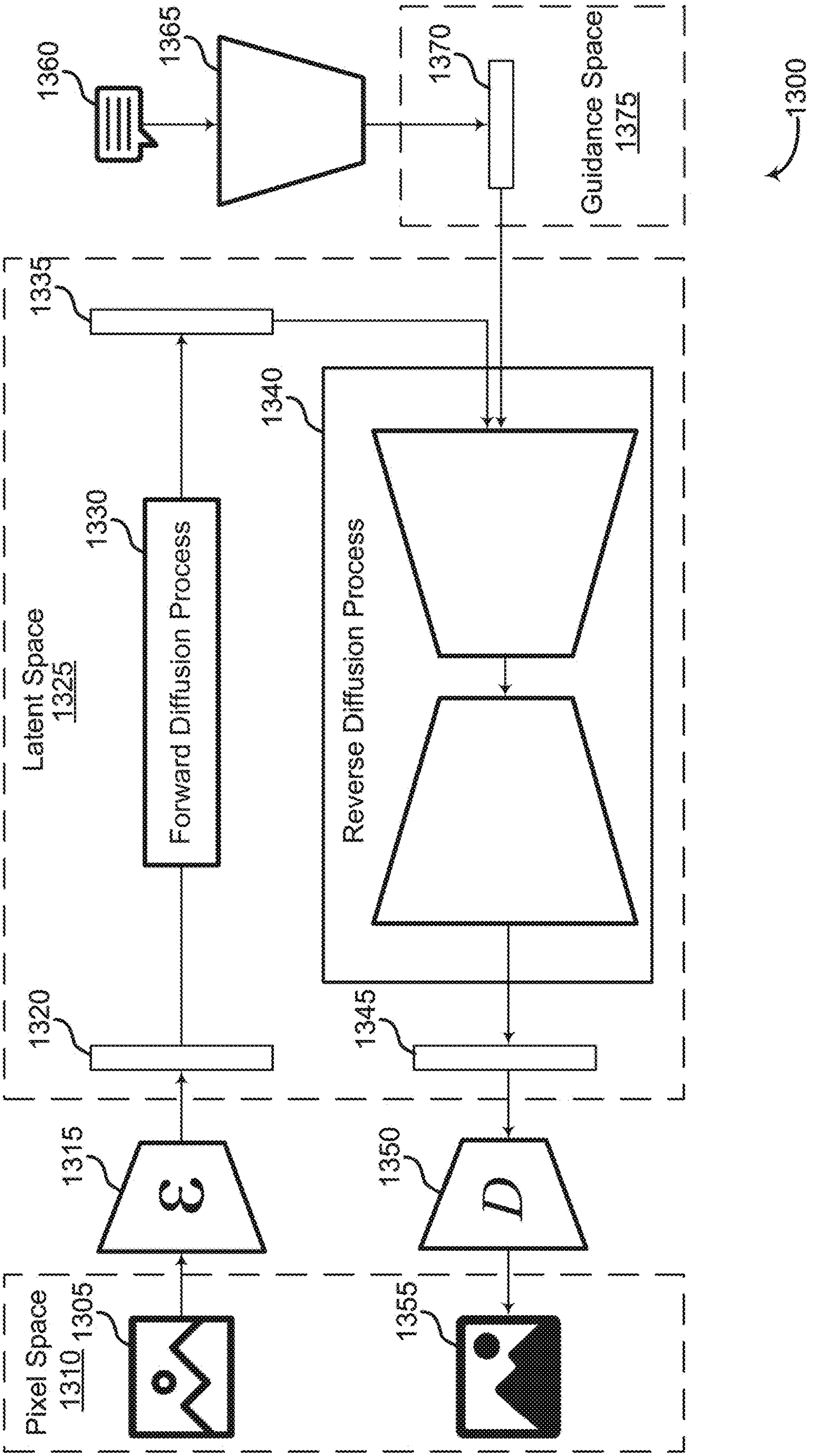
FIG. 13 shows an example of a guided latent diffusion model according to aspects of the present disclosure.

FIG. 13 shows an example of a guided latent diffusion model 1300 according to aspects of the present disclosure. The guided latent diffusion model 1300 depicted in FIG. 13 is an example of, or includes aspects of, the corresponding element (i.e., image generator 835) described with reference to FIG. 8.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 1300 may take an original image 1305 in a pixel space 1310 as input and apply and image encoder 1315 to convert original image 1305 into original image features 1320 in a latent space 1325. Then, a forward diffusion process 1330 gradually adds noise to the original image features 1320 to obtain noisy features 1335 (also in latent space 1325) at various noise levels.

Next, a reverse diffusion process 1340 (e.g., a U-Net ANN) gradually removes the noise from the noisy features 1335 at the various noise levels to obtain denoised image features 1345 in latent space 1325. In some examples, the denoised image features 1345 are compared to the original image features 1320 at each of the various noise levels, and parameters of the reverse diffusion process 1340 of the diffusion model are updated based on the comparison. Finally, an image decoder 1350 decodes the denoised image features 1345 to obtain an output image 1355 in pixel space 1310. In some cases, an output image 1355 is created at each of the various noise levels. The output image 1355 can be compared to the original image 1305 to train the reverse diffusion process 1340.

In some cases, image encoder 1315 and image decoder 1350 are pre-trained prior to training the reverse diffusion process 1340. In some examples, they are trained jointly, or the image encoder 1315 and image decoder 1350 and fine-tuned jointly with the reverse diffusion process 1340.

The reverse diffusion process 1340 can also be guided based on a text prompt 1360, or another guidance prompt, such as an image, a layout, a segmentation map, etc. The text prompt 1360 can be encoded using a text encoder 1365 (e.g., a multimodal encoder) to obtain guidance features 1370 in guidance space 1375. The guidance features 1370 can be combined with the noisy features 1335 at one or more layers of the reverse diffusion process 1340 to ensure that the output image 1355 includes content described by the text prompt 1360. For example, guidance features 1370 can be combined with the noisy features 1335 using a cross-attention block within the reverse diffusion process 1340.

Figure 14:
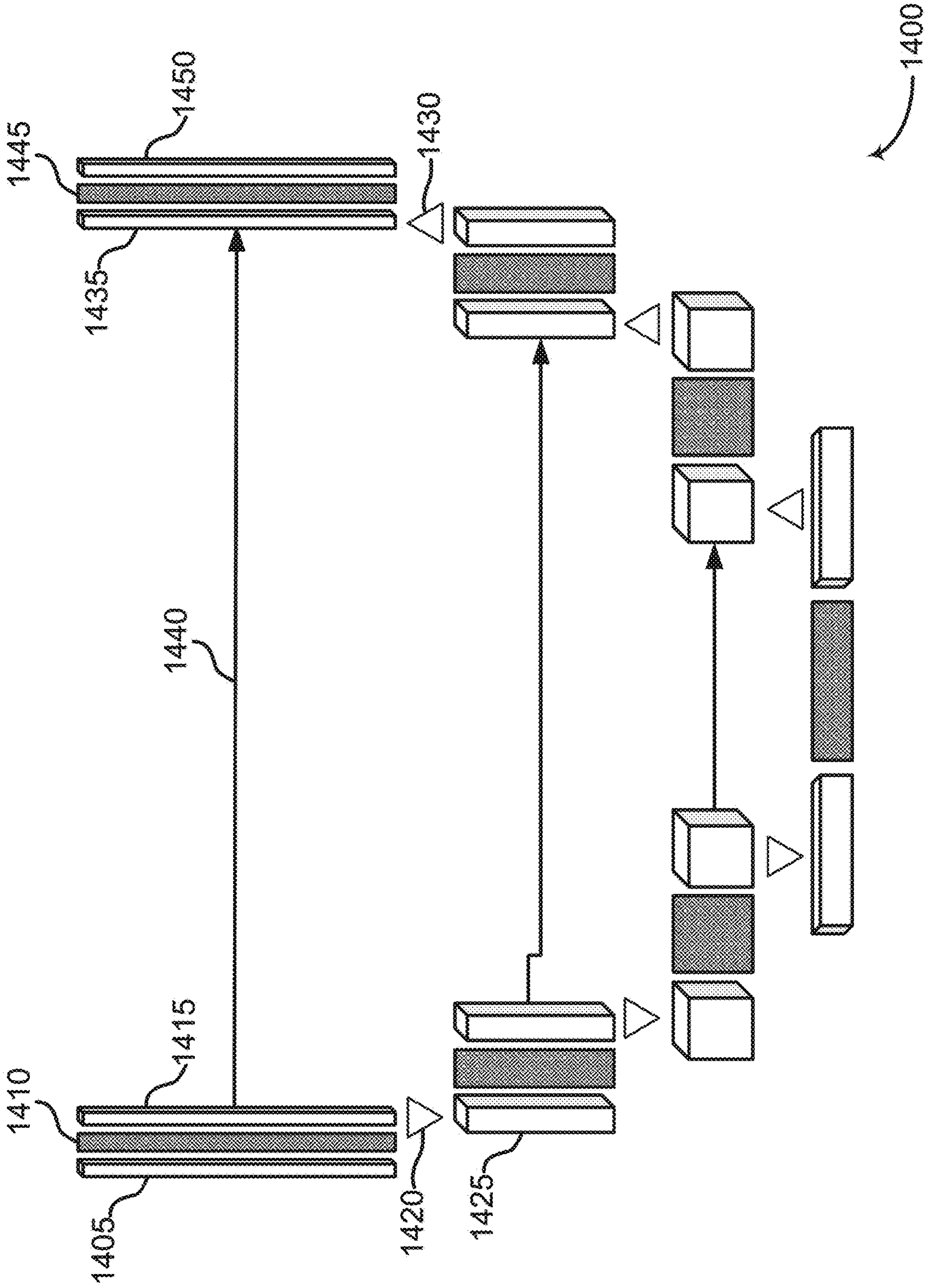
FIG. 14 shows an example of a U-Net architecture according to aspects of the present disclosure.

FIG. 14 shows an example of a U-Net 1400 architecture according to aspects of the present disclosure. The U-Net 1400 depicted in FIG. 14 is an example of, or includes aspects of, the architecture used within the reverse diffusion process described with reference to FIG. 13.

In some examples, diffusion models are based on a neural network architecture known as a U-Net. The U-Net 1400 takes input features 1405 having an initial resolution and an initial number of channels, and processes the input features 1405 using an initial neural network layer 1410 (e.g., a convolutional network layer) to produce intermediate features 1415. The intermediate features 1415 are then down-sampled using a down-sampling layer 1420 such that down-sampled features 1425 features have a resolution less than the initial resolution and a number of channels greater than the initial number of channels.

This process is repeated multiple times, and then the process is reversed. That is, the down-sampled features 1425 are up-sampled using up-sampling process 1430 to obtain up-sampled features 1435. The up-sampled features 1435 can be combined with intermediate features 1415 having a same resolution and number of channels via a skip connection 1440. These inputs are processed using a final neural network layer 1445 to produce output features 1450. In some cases, the output features 1450 have the same resolution as the initial resolution and the same number of channels as the initial number of channels.

In some cases, U-Net 1400 takes additional input features to produce conditionally generated output. For example, the additional input features could include a vector representation of an input prompt. The additional input features can be combined with the intermediate features 1415 within the neural network at one or more layers. For example, a cross-attention module can be used to combine the additional input features and the intermediate features 1415.

Localized Attention-Guided Sampling

Figure 15:
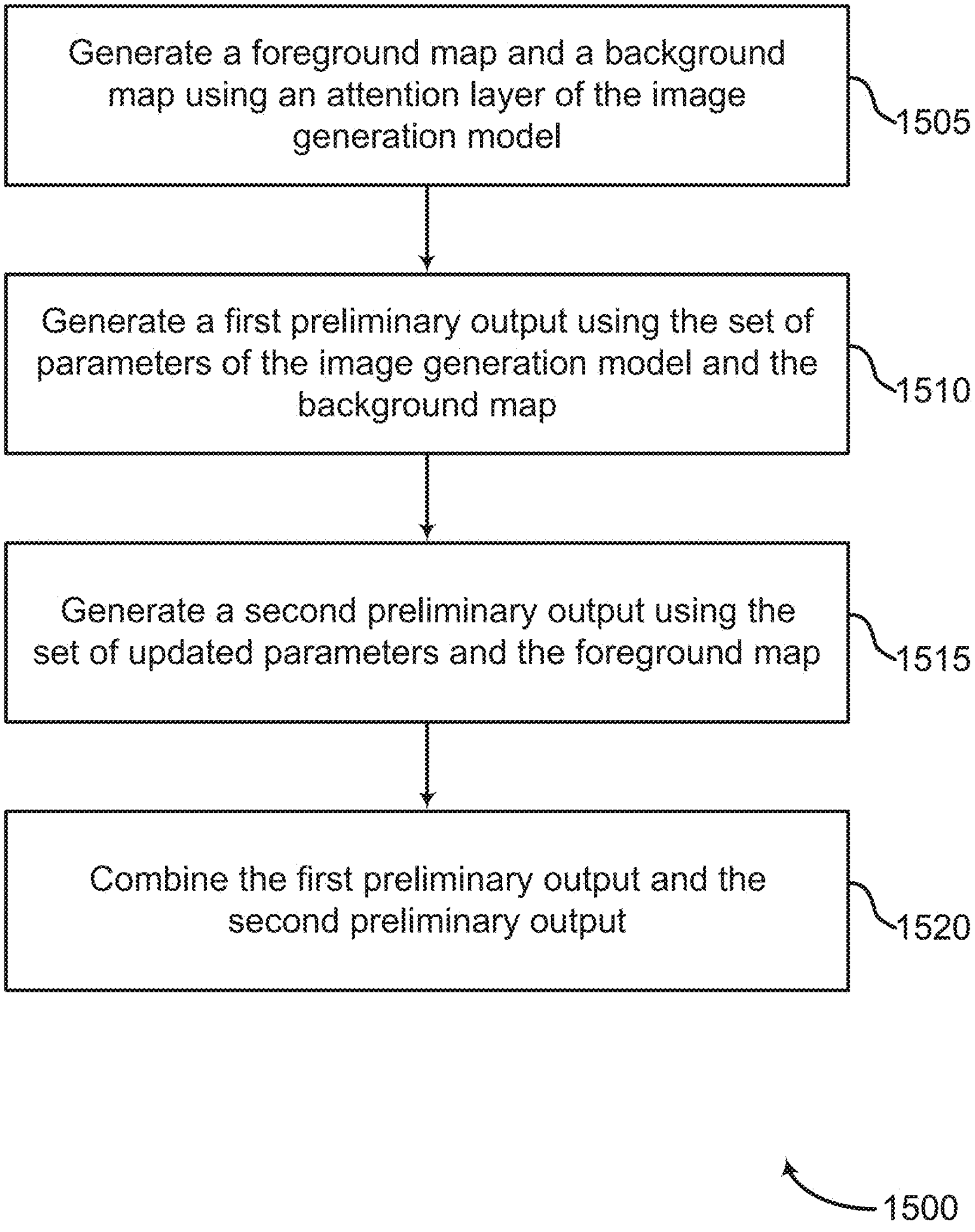
FIG. 15 shows an example of a method for generating an intermediate output according to aspects of the present disclosure.

FIG. 15 shows an example of a method 1500 for generating an intermediate output according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system generates a foreground map and a background map using an attention layer of the image generation model. In some cases, the operations of this step refer to, or may be performed by, an image generation model as described with reference to FIGS. 8, and 10-12. In some examples, a foreground map and a background map refer to $M_i$ and $1-M_i$, respectively.

At operation 1510, the system generates a first preliminary output using the set of parameters of the image generation model and the background map. In some cases, the operations of this step refer to, or may be performed by, an image generation model as described with reference to FIGS. 8, and 10-12. A first preliminary output refers to the first term in the Eq. (3), i.e., $(1-M_i)\otimes f_i$. Here, $f_i=W_i x$ is the feature produced using the original convolutional weight $W_i$. In some cases, the set of parameters of the image generation model are denoted as $W_i$.

At operation 1515, the system generates a second preliminary output using the set of updated parameters and the foreground map. In some cases, the operations of this step refer to, or may be performed by, an image generation model as described with reference to FIGS. 8, and 10-12. A second preliminary output refers to the second term in the Eq. (3), i.e., $$M_i \otimes f_i'.$$

Here, $$f_i' = W_i' x$$

is the feature produced using the updated weight from the personalized residuals $$W_i' = W_i + \Delta W_i.$$

In some cases, the set of updated parameters are denoted as $$W_i'.$$

The set of customized residuals are denoted as $\Delta W_i$.

At operation 1520, the system combines the first preliminary output and the second preliminary output. In some cases, the operations of this step refer to, or may be performed by, an image generation model as described with reference to FIGS. 8, and 10-12. In some examples, combining the first preliminary output and the second preliminary output obtains an intermediate output $\hat{f}_i$.

Training and Evaluation

Figure 16:
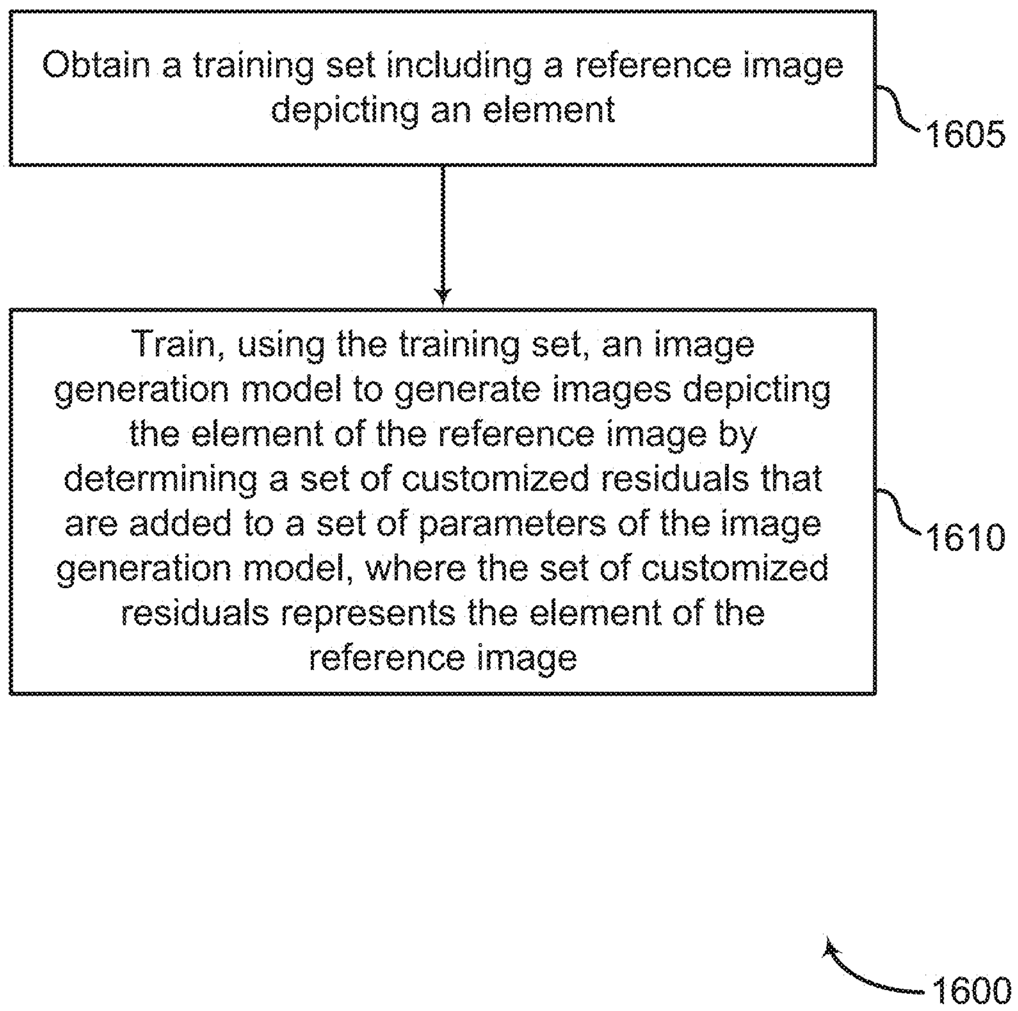
FIGS. 16 and 17 show examples of methods for training an image generation model according to aspects of the present disclosure.
Figure 17:
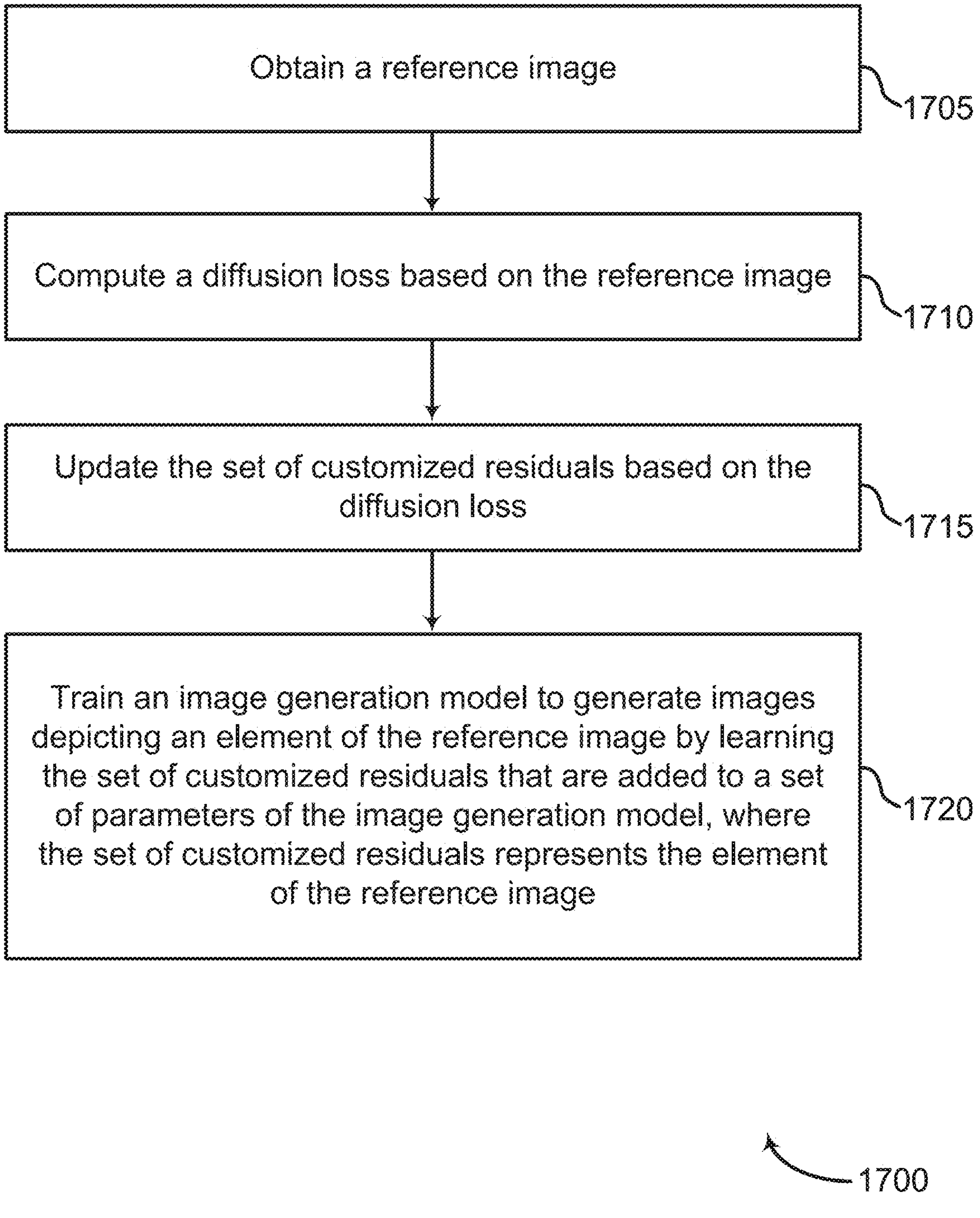

In FIGS. 16-17, a method, apparatus, and non-transitory computer readable medium for image generation are described. One or more embodiments of the method, apparatus, and non-transitory computer readable medium include obtaining a reference image and training an image generation model to generate images depicting an element of the reference image by learning a set of customized residuals that are added to a set of parameters of the image generation model, wherein the set of customized residuals represents the element of the reference image.

In some examples, the set of customized residuals comprises a low rank adaptation of the set of parameters. In some examples, the image generation model comprises a pre-trained model and the set of parameters of the image generation model are fixed while learning the set of customized residuals.

Some examples of the method, apparatus, and non-transitory computer readable medium further include computing a diffusion loss based on the reference image. Some examples further include updating the set of customized residuals based on the diffusion loss.

Some examples of the method, apparatus, and non-transitory computer readable medium further include learning a plurality of sets of customized residuals that are added to a plurality of different layers of the image generation model at a plurality of different resolutions, respectively.

FIG. 16 shows an example of a method 1600 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system obtains a training set including a reference image depicting an element. In some cases, the operations of this step refer to, or may be performed by, a training component as described with reference to FIG. 8. In some examples, an image generation model is initialized using random values. In other examples, the image generation model is initialized based on a pre-trained model. In some examples, the image generation model includes base parameters from a pre-trained model and additional parameters (a set of customized parameters) are added to the pre-trained model for fine-tuning. The fine-tuning process includes learning a set of customized residuals that are added to a set of parameters of the image generation model, where the set of customized residuals represents the element of the reference image. In this case, the additional parameters are initialized randomly and trained during a fine-tuning phase while the parameters from the base model are fixed during the fine-tuning phase.

At operation 1610, the system trains, using the training set, an image generation model to generate images depicting the element of the reference image by determining a set of customized residuals that are added to a set of parameters of the image generation model, where the set of customized residuals represents the element of the reference image. In some cases, the operations of this step refer to, or may be performed by, a training component as described with reference to FIG. 8. In some cases, obtaining a training set may include creating training data for training the image generation model.

In some examples, the image generation model includes a diffusion model (e.g., Stable Diffusion model). For each transformer block i, the training component is configured to compute the rank $r_i$ for its output projection convolution layer with weight matrix $W_i \in \mathbb{R}^{m_i \times m_i \times 1}$ as $r_i = 0.05\ m_i$, totaling 1.2M trainable parameters (~0.1% of Stable Diffusion). Each of the low-rank matrices are randomly initialized. The training component trains the image generation model for 150 iterations with a batch size of 4 and learning rate of 1.0e-3 on 1 A100 GPU (~3 minutes) across experiments.

In some embodiments, the training component learns low-rank offsets for a small subset of the diffusion model weights (to represent the target concept shown in the reference image) while better preserving the existing prior (i.e., the set of parameters of the image generation model). In some cases, multiple reference images depicting a same target concept are used to train the image generation model.

FIG. 17 shows an example of a method 1700 for training an image generation model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system obtains a reference image. In some cases, the operations of this step refer to, or may be performed by, a training component as described with reference to FIG. 8.

At operation 1710, the system computes a diffusion loss based on the reference image. In some cases, the operations of this step refer to, or may be performed by, a training component as described with reference to FIG. 8. An example of computing diffusion loss is described above in FIG. 10.

In an embodiment, the encoder $\varepsilon$ of an image generation model (e.g., a latent diffusion model or LDM) embeds an input image x into a latent representation $z=\varepsilon(x)$ and a decoder $\mathcal{D}$ of the image generation model maps z back into pixel space $x'=\mathcal{D}(z)$. The diffusion portion of LDM operates on z and is trained using the loss function $\mathcal{L}_{LDM}$ as described in FIG. 10.

At operation 1715, the system updates the set of customized residuals based on the diffusion loss. In some cases, the operations of this step refer to, or may be performed by, a training component as described with reference to FIG. 8. In an embodiment, operations 1715 and 1720 relate to a process of learning a set of customized residuals (i.e., personalized residuals). Given a pre-trained text-to-image diffusion model containing L transformer blocks, the training component is configured to learn $\Delta W_i = A_i B_i \in \mathbb{R}^{m_i \times m_i}$ for the output projection layer $l_{proj\_out,i}$ with weight matrix $W_i \in \mathbb{R}^{m_i \times m_i \times 1}$ within each transformer block i, where $A_i \in \mathbb{R}^{m_i \times r_i}$ and $B_i \in \mathbb{R}^{r_i \times m_i}$. The training component reshapes the customized residuals such that $\Delta W_i \in \mathbb{R}^{m_i \times m_i \times 1}$ and adds the customized residuals $\Delta W_i$ to the original weights $W_i$ to produce $$W_i' = W_i + \Delta W_i.$$

The set or customized residuals $\Delta W_i$'s are updated using the diffusion loss function, i.e., Eq. (1) described in FIG. 10.

At operation 1720, the system trains an image generation model to generate images depicting an element of the reference image by learning the set of customized residuals that are added to a set of parameters of the image generation model, where the set of customized residuals represents the element of the reference image. In some cases, the operations of this step refer to, or may be performed by, a training component as described with reference to FIG. 8.

Figure 18:
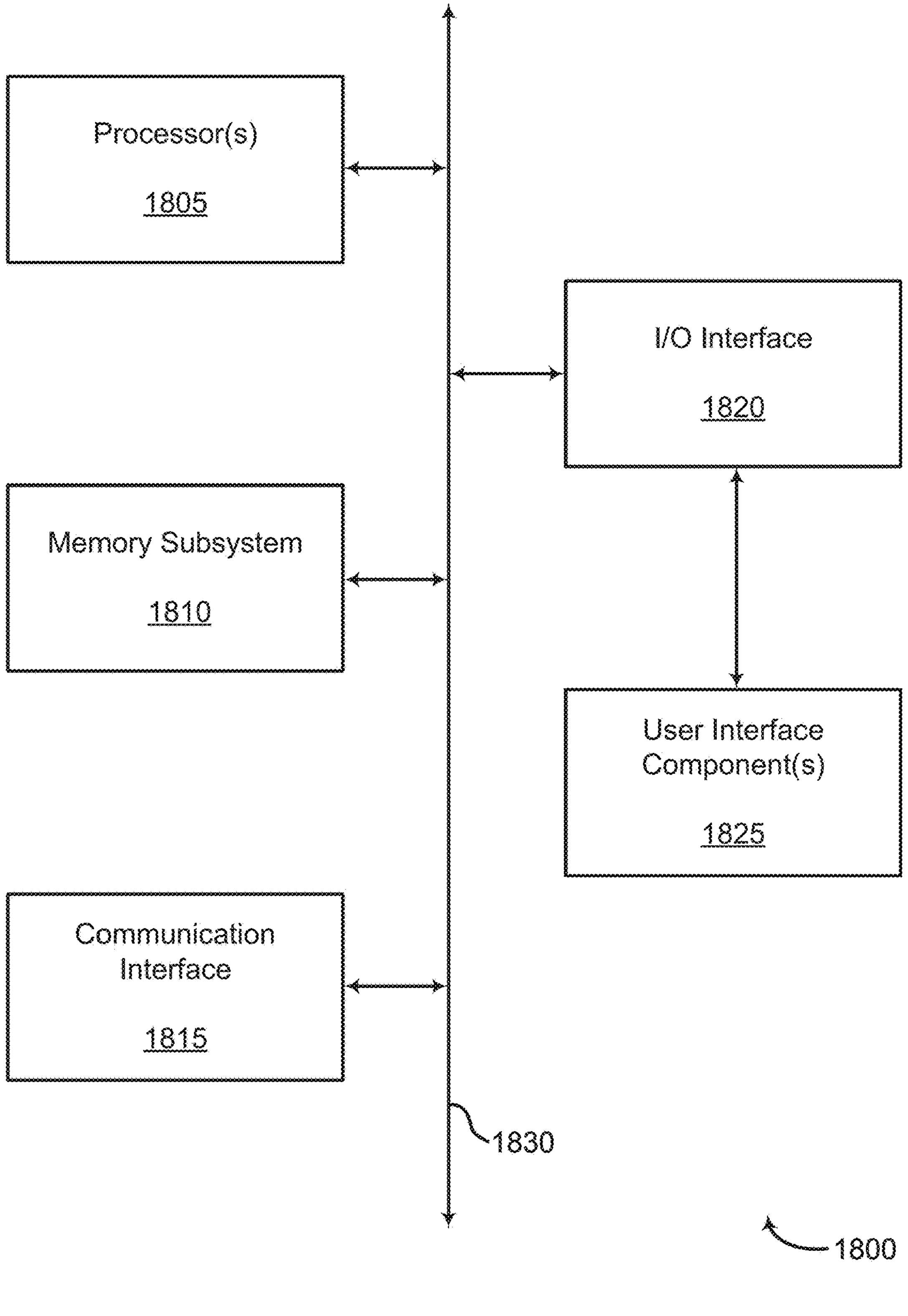
FIG. 18 shows an example of a computing device for image generation according to aspects of the present disclosure.

FIG. 18 shows an example of a computing device 1800 for image generation according to aspects of the present disclosure. The example shown includes computing device 1800, processor(s) 1805, memory subsystem 1810, communication interface 1815, I/O interface 1820, user interface component(s) 1825, and channel 1830. In one embodiment, computing device 1800 includes processor(s) 1805, memory subsystem 1810, communication interface 1815, I/O interface 1820, user interface component(s) 1825, and channel 1830.

In some embodiments, computing device 1800 is an example of, or includes aspects of, image generation apparatus 110 of FIG. 1. In some embodiments, computing device 1800 includes one or more processors 1805 that can execute instructions stored in memory subsystem 1810 to obtain an input prompt; generate, using an image generation model, an intermediate output based on the input prompt by adding a set of customized residuals to a set of parameters of the image generation model, respectively, to obtain a set of updated parameters, wherein the set of customized residuals represents an element of a reference image; and generate, using the image generation model, a synthesized image based on the input prompt and the intermediate output, wherein the synthesized image depicts the element of the reference image and an element of the input prompt.

According to some embodiments, computing device 1800 includes one or more processors 1805. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1810 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1815 operates at a boundary between communicating entities (such as computing device 1800, one or more user devices, a cloud, and one or more databases) and channel 1830 and can record and process communications. In some cases, communication interface 1815 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1820 is controlled by an I/O controller to manage input and output signals for computing device 1800. In some cases, I/O interface 1820 manages peripherals not integrated into computing device 1800. In some cases, I/O interface 1820 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1820 or via hardware components controlled by the I/O controller.

According to some embodiments, user interface component(s) 1825 enable a user to interact with computing device 1800. In some cases, user interface component(s) 1825 include an audio device, such as an external speaker system, an external display device such as a display screen, an input device (e.g., a remote control device interfaced with a user interface directly or through the I/O controller), or a combination thereof. In some cases, user interface component(s) 1825 include a GUI.

Performance of apparatus, systems and methods of the present disclosure have been evaluated, and results indicate embodiments of the present disclosure have obtained increased performance over existing technology. Example experiments demonstrate that the image generation apparatus described in embodiments of the present disclosure outperforms conventional systems.

Example experiments have been conducted using the described personalized/customized residuals with and without localized attention-guided sampling. Some example experiments include visualizing samples generated by each method for various types of prompts. Textual Inversion method fails to reliably capture the concept's identity and/or the prompt whereas the described methods of the present disclosure can better preserve the concept's identity while adhering to the text prompt. Embodiments of the present disclosure achieve these results while having significantly fewer learnable parameters and incurring less training time compared to conventional methods (e.g., ViCo, DreamBooth, and Custom Diffusion) as well as not leveraging regularization images.

In some examples, CustomConcept101 dataset is used. CustomConcept101 dataset includes 101 concepts across 16 broader categories. For every concept, 50 samples are generated for each of the 20 prompts given by the dataset. DDIM sampling is performed with N=50 steps, $\eta$=0.0, and a guidance scale of 6.0. The same random seed is set for sampling across the methods described in the present disclosure so that the "choice" of starting noise does not impact the results.

In some examples, methods, apparatus, and system of the present disclosure are evaluated for text alignment and image alignment. Text alignment is measured as the similarity between the CLIP text feature of the input prompt and the CLIP image feature of the resulting generated image. Image alignment is measured as the similarity between image features from CLIP or DINO of the reference images and corresponding generated images.

Evaluation metrics include evaluating text and image alignment using human evaluations through user studies on Amazon Mechanical Turk (AMT). For each text alignment case, a text prompt and a pair of corresponding generated images are displayed, and users are asked the question "Which image is more consistent with the given text prompt?". For each image alignment case, 3 reference images for a concept and a pair of corresponding generated images are displayed, and users are asked the question "Which image better preserves the identity of the subject in the provided reference images?". For both studies, each pair of images contains one from {Textual Inversion, ViCo, DreamBooth, Custom Diffusion, Ours w/LAG sampling} and one from ours with normal DDIM sampling. Users can select either image or neither ("Not sure").

In some experiments involving results of 1250 responses collected through AMT user studies for both text and image alignment, it is shown that the CLIP text alignment scores do not necessarily correlate to human preference. Embodiments of the present disclosure have competitive performance compared to Custom Diffusion for text alignment, which was assigned the highest CLIP text score, and outperform all baselines for image alignment. Furthermore, embodiments of the present disclosure achieve competitive performance compared to baselines while being significantly more computationally efficient.

In some example experiments, ablation studies are performed on changing the targets for where the residuals are applied, removing the macro class from an input prompt, including regularization images (sampled from LAION) during training, updating the concept identifier token embedding V*, and varying the rank of the residuals.

It has been shown that changing where the residuals are applied to either the key and value weights of the cross-attention layers or the input projection conv layer (rather than the output) slightly decreases the scores across all three metrics. In some cases, the output projection layer achieves noticeably higher identity preservation because it refines the feature map at the end of each block.

Omitting the macro class leads to significant drops across all metrics, demonstrating that the additional information is useful to methods for knowing what within the reference images is important to the image generation model. Similar to the effect of using regularization images for DreamBooth and Custom Diffusion, regularization images slightly improves text alignment but decreases image alignment. On the other hand, updating the token embedding for V* leads to over-fitting by the increase in image alignment and decrease in text alignment.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

obtaining an input prompt including an element that indicates a target concept;

adding a customized residual to a base parameter of an image generation model based on the element of the input prompt to obtain an updated parameter, wherein the customized residual comprises one of a set of customized residuals that encode an identity of the target concept, and wherein the base parameter comprises a parameter of a projection layer in a transformer layer of the image generation model; and generating, using the image generation model, a synthesized image depicting the target concept based on the input prompt by performing a transformer operation using the transformer layer with the updated parameter.

2. The method of claim 1, wherein:

the element of the input prompt indicates an object depicted in a reference image used to learn the customized residual.

3. The method of claim 1, further comprising:

encoding the input prompt to obtain a text embedding, wherein the synthesized image is generated based on the text embedding.

4. The method of claim 1, wherein:

the base parameter is in the transformer layer of the image generation model.

5. The method of claim 1, wherein generating the synthesized image comprises:

generating a foreground map and a background map using an attention layer of the image generation model;

generating a first preliminary output using the base parameter and the background map;

generating a second preliminary output using the updated parameter and the foreground map; and combining the first preliminary output and the second preliminary output to obtain an intermediate output.

6. The method of claim 5, further comprising:

binarizing an output of the attention layer to obtain the foreground map and the background map.

7. The method of claim 1, wherein:

the base parameter comprises a parameter of a one-by-one convolutional block.

8. The method of claim 1, wherein:

the customized residual comprises a low rank adaptation of the base parameter.

9. The method of claim 1, further comprising:

adding the set of customized residuals to a plurality of different layers of the image generation model at a plurality of different resolutions, respectively.

10. The method of claim 1, wherein generating the synthesized image comprises:

performing a diffusion process on a noise input.

11. The method of claim 1, wherein:

the input prompt includes a nonce token representing the element and an additional token representing a target action of the element; and the synthesized image depicts the element performing the target action.

12. A method comprising:

obtaining a training set including a reference image depicting an element that indicates a target concept; and training, using the training set, an image generation model to generate images depicting the element of the reference image by determining a customized residual to be added to a base parameter of the image generation model, wherein the customized residual comprises one of a set of customized residuals that encode an identity of the target concept, and wherein the base parameter comprises a parameter of a projection layer in a transformer layer of the image generation model.

13. The method of claim 12, wherein:

the customized residual comprises a low rank adaptation of the base parameter.

14. The method of claim 12, wherein:

the image generation model comprises a pre-trained model and the base parameter is fixed while learning the customized residual.

15. The method of claim 12, further comprising:

computing a diffusion loss based on the reference image; and updating the customized residual based on the diffusion loss.

16. The method of claim 12, wherein training the image generation model comprises:

learning a plurality of customized residuals that are added to a plurality of different layers of the image generation model at a plurality of different resolutions, respectively.

17. An apparatus comprising:

at least one processor;

at least one memory including instructions executable by the at least one processor to perform operations comprising:

obtaining an input prompt;

adding a customized residual to a base parameter of an image generation model based on an element of the input prompt to obtain an updated parameter, wherein the customized residual is determined based on the element of the input prompt; and generating, using the image generation model with the updated parameter, a synthesized image depicting the element based on the input prompt, wherein generating the synthesized image comprises:

generating a foreground map and a background map using an attention layer of the image generation model;

generating a first preliminary output using the base parameter and the background map;

generating a second preliminary output using the updated parameter and the foreground map; and combining the first preliminary output and the second preliminary output to obtain an intermediate output.

18. The apparatus of claim 17, further comprising:

a text encoder trained to encode the input prompt.

19. The apparatus of claim 17, wherein:

the image generation model comprises a diffusion model.

20. The apparatus of claim 17, wherein:
the base parameter is located within a projection block of a transformer layer.

* * * * *